(12) United States Patent
Firth et al.

(10) Patent No.: US 10,414,194 B2
(45) Date of Patent: Sep. 17, 2019

(54) OPTICALLY VARIABLE DEVICES, THEIR PRODUCTION AND USE

(71) Applicant: Bank of Canada, Ottawa (CA)

(72) Inventors: Andrea Victoria Firth, Ottawa (CA); Steven Paul McGarry, Ottawa (CA); Alasdair Patrick Rankin, Ottawa (CA)

(73) Assignee: Bank of Canada, Ottawa (CA)

( * ) Notice: Subject to any disclaimer, the term of this patent is extended or adjusted under 35 U.S.C. 154(b) by 296 days.

(21) Appl. No.: 15/035,045

(22) PCT Filed: Nov. 6, 2014

(86) PCT No.: PCT/CA2014/051069
§ 371 (c)(1),
(2) Date: May 6, 2016

(87) PCT Pub. No.: WO2015/066809
PCT Pub. Date: May 14, 2015

(65) Prior Publication Data
US 2016/0280000 A1 Sep. 29, 2016

Related U.S. Application Data

(60) Provisional application No. 62/056,090, filed on Sep. 26, 2014, provisional application No. 61/901,592, filed on Nov. 8, 2013.

(51) Int. Cl.
*B42D 25/369* (2014.01)
*B42D 25/36* (2014.01)
(Continued)

(52) U.S. Cl.
CPC ............... *B42D 25/36* (2014.10); *B32B 5/24* (2013.01); *B32B 7/12* (2013.01); *B32B 9/005* (2013.01);
(Continued)

(58) Field of Classification Search
CPC .............. B42D 25/369; B42D 2033/12; B42D 2033/16
See application file for complete search history.

(56) References Cited

U.S. PATENT DOCUMENTS

| | | | |
|---|---|---|---|
| 5,690,993 A | 11/1997 | Malhotra et al. | |
| 6,992,826 B2 | 1/2006 | Wang | |

(Continued)

FOREIGN PATENT DOCUMENTS

| | | | |
|---|---|---|---|
| CA | 2542632 A1 | 3/2005 | |
| CA | 2555821 A1 | 8/2005 | |

(Continued)

OTHER PUBLICATIONS

International Search Report issued in corresponding International Application No. PCT/CA2014/051069, dated Jan. 12, 2015.
(Continued)

*Primary Examiner* — Kyle R Grabowski
(74) *Attorney, Agent, or Firm* — Banner & Witcoff, Ltd.

(57) ABSTRACT

Disclosed herein are devices that change their appearance and/or physical properties when under an external influence, and methods for their production and use. Such devices may be used as features of any type of items, documents, billboards, posters, display devices, advertisements and other items etc. and may be adapted to include decipherable content. Such devices also afford new techniques for a user to check quickly and easily whether the item is a legitimate or a counterfeit copy, either by hand-manipulation of the device, or with the assistance of an additional screening tool.

24 Claims, 25 Drawing Sheets

(51) Int. Cl.

| | | |
|---|---|---|
| B82Y 20/00 | (2011.01) | |
| G02B 26/02 | (2006.01) | |
| B42D 25/351 | (2014.01) | |
| B42D 25/46 | (2014.01) | |
| B42D 25/355 | (2014.01) | |
| B42D 25/47 | (2014.01) | |
| B42D 25/445 | (2014.01) | |
| B32B 5/24 | (2006.01) | |
| B32B 7/12 | (2006.01) | |
| B32B 9/00 | (2006.01) | |
| B32B 25/12 | (2006.01) | |
| B32B 27/06 | (2006.01) | |
| B32B 27/28 | (2006.01) | |
| B32B 27/30 | (2006.01) | |
| B32B 27/32 | (2006.01) | |
| B32B 27/40 | (2006.01) | |
| B32B 29/00 | (2006.01) | |
| B42D 25/23 | (2014.01) | |
| B42D 25/24 | (2014.01) | |
| B42D 25/29 | (2014.01) | |
| G02F 1/01 | (2006.01) | |
| G02F 1/09 | (2006.01) | |
| D21H 21/48 | (2006.01) | |
| G02B 5/00 | (2006.01) | |
| G02B 26/00 | (2006.01) | |
| B42D 25/364 | (2014.01) | |
| G02F 1/167 | (2019.01) | |
| G07D 7/005 | (2016.01) | |

(52) U.S. Cl.
CPC .............. *B32B 25/12* (2013.01); *B32B 27/06* (2013.01); *B32B 27/283* (2013.01); *B32B 27/304* (2013.01); *B32B 27/322* (2013.01); *B32B 27/40* (2013.01); *B32B 29/002* (2013.01); *B42D 25/23* (2014.10); *B42D 25/24* (2014.10); *B42D 25/29* (2014.10); *B42D 25/351* (2014.10); *B42D 25/355* (2014.10); *B42D 25/364* (2014.10); *B42D 25/369* (2014.10); *B42D 25/445* (2014.10); *B42D 25/46* (2014.10); *B42D 25/47* (2014.10); *B82Y 20/00* (2013.01); *D21H 21/48* (2013.01); *G02B 5/008* (2013.01); *G02B 26/00* (2013.01); *G02B 26/02* (2013.01); *G02F 1/0131* (2013.01); *G02F 1/0136* (2013.01); *G02F 1/09* (2013.01); *G02F 1/167* (2013.01); *G07D 7/005* (2017.05); *B32B 2255/20* (2013.01); *B32B 2255/205* (2013.01); *B32B 2307/20* (2013.01); *B32B 2307/208* (2013.01); *B32B 2307/40* (2013.01); *B32B 2307/41* (2013.01); *B32B 2307/412* (2013.01); *B32B 2307/414* (2013.01); *B32B 2457/20* (2013.01); *B32B 2551/00* (2013.01); *B32B 2590/00* (2013.01); *G02F 2001/094* (2013.01)

(56) References Cited

U.S. PATENT DOCUMENTS

| | | | |
|---|---|---|---|
| 9,082,054 B2 * | 7/2015 | MacPherson | B42D 25/29 |
| 2005/0181160 A1 * | 8/2005 | Schneider | B42D 25/29 |
| | | | 428/36.4 |
| 2008/0075668 A1 | 3/2008 | Goldstein | |
| 2009/0034055 A1 | 2/2009 | Gibson | |
| 2009/0207465 A1 | 8/2009 | Riddle et al. | |
| 2009/0323171 A1 | 12/2009 | Gibson | |
| 2012/0091699 A1 * | 4/2012 | Krueger | B42D 25/369 |
| | | | 283/67 |
| 2012/0139230 A1 * | 6/2012 | Whiteman | B42D 25/364 |
| | | | 283/72 |
| 2012/0229881 A1 * | 9/2012 | Hollman | G02F 1/178 |
| | | | 359/245 |
| 2013/0147179 A1 * | 6/2013 | Baloukas | B42D 25/00 |
| | | | 283/74 |

FOREIGN PATENT DOCUMENTS

| | | | | |
|---|---|---|---|---|
| EP | 0721176 B1 * | 10/1999 | .......... | G02B 26/026 |
| WO | 2006046978 A2 | 5/2006 | | |
| WO | 2007069068 A2 | 6/2007 | | |
| WO | 2010115928 A2 | 10/2010 | | |
| WO | WO-2010119248 A2 * | 10/2010 | ............. | B42D 25/29 |
| WO | 2011050128 A1 | 4/2011 | | |
| WO | 2011/130843 A1 | 10/2011 | | |
| WO | WO-2011130842 A1 * | 10/2011 | ............. | B42D 25/29 |
| WO | WO-2011130843 A1 * | 10/2011 | ............. | B42D 25/29 |
| WO | 2012156728 A1 | 11/2012 | | |
| WO | 2015066808 A1 | 5/2015 | | |

OTHER PUBLICATIONS

European Search Report issued from corresponding European Patent Application No. 14859442.7, dated Apr. 7, 2017.
International Search Report issued in corresponding International Application No. PCT/CA2014/051068, dated Jan. 9, 2015.
International Search Report issued in corresponding International Application No. PCT/CA2014/051070, dated Jan. 13, 2015.

* cited by examiner a)

Magnets / Electrets
- 5.5 μm radius
- 3 μm thickness
- 3 x 3 array

Platelets
- 2.5 μm radius
- 1 μm thickness
- 6 x 6 array b)

Distance apart
- 3.1 μm gap
- Simulations over a range of gap sizes a)

- Average force on four center platelets in blue
- Force of gravity on a single platelet in red ($F_g$=1.5 pN)
- Crosses around 42 μm b)

- Average force on four center platelets in blue
- Force of gravity on a single platelet in red ($F_g$=1.5 pN)
- Crosses around 53 μm

OPTICALLY VARIABLE DEVICES, THEIR PRODUCTION AND USE

RELATED APPLICATION DATA

This application is a National Stage Application under 35 U.S.C. 371 of co-pending PCT application number PCT/CA2014/051069 designating the United States and filed Nov. 6, 2014; which claims the benefit of U.S. Provisional Application Nos. 62/056,090 filed on Sep. 26, 2014, and 61/901,592 filed on Nov. 8, 2013, each of which are hereby incorporated herein by reference in their entireties.

FIELD OF THE INVENTION

The invention relates to the field of devices that can undergo a change either in terms of their optical or physical properties, as well as methods for their production and use. Such devices may, for example, be used as display devices or screens, or be used for authentication of items or security documents of value, including documents which may be subject to counterfeiting, such as passports, banknotes, credit cards, cheques, identification cards or certificates, and other articles.

BACKGROUND TO THE INVENTION

Interactive display devices are known, which can undergo a change in optical appearance in response to some form of external stimulus. Typically, such devices comprise a layered or multi-layered structure where user manipulation of the device, or a user-initiated external influence upon the device, causes a change in appearance of the device, or at least a portion thereof.

However, there remains a need in the art for variable devices, optionally in the form of a display screens or thin-layer devices, that can undergo some form of observable or detectable optical or physical change when under an external influence. The need extends to display devices with relatively simple or more complex content, that are single use or that can repeatedly undergo the same change in optical or physical characteristics. Ideally, though not necessarily, there is a need for such devices that can be manufactured in a relatively simple and inexpensive manner. The need for such devices extends into multiple disciplines, including but not limited to interactive media material, advertisements, magazines, books or other paper items with user-manipulated content, advertizing billboards, and authentication devices for security documents such as passports, credit cards and bank notes to help prevent counterfeit.

In particular, there is a need for such devices that are typically flat or planar in nature so that optionally they can take the appearance of being flush with a planar substrate to which they are applied, even including (but not limited to) devices that are amenable to folding, bending or crumpling without significant damage or affect upon the functionality of the device, thus to improve robustness and longevity of the device when located within or mounted upon a rigid or non-rigid substrate.

SUMMARY OF THE INVENTION

It is an object of the invention, at least in selected embodiments, to provide a variable device at least a portion of which can undergo a change in optical appearance or physical characteristics in response to an external influence.

It is another object of the invention, at least in selected embodiments, to provide a method to check whether an item or document is a legitimate or counterfeit version.

Certain exemplary embodiments provide an optically variable device, the device comprising:
  a control element or layer;
  one or more responsive optical element(s);
  the control element or layer and the responsive optical element(s) moveable in the device relative to one another upon application of an external influence upon the device, to change the distance of separation of the control element or layer from the responsive optical element(s), and therefore to change a degree of influence of the control element or layer upon the responsive optical element(s), to cause a change of perceivable or detectable optical properties of the device.

Certain other exemplary embodiments provide a variable device that undergoes a user-detectable tactile change, the device comprising:
  a control element or layer;
  one or more responsive element(s);
  the control element or layer and the responsive element(s) moveable in the device relative to one another upon application of an external influence upon the device, to change the distance of separation of the control element or layer from the responsive element(s), and therefore to change a degree of influence of the control element or layer upon the responsive optical element(s), to cause a change of perceivable or detectable physical properties of the device.

Certain other exemplary embodiments provide an optically variable device, the device comprising:
  a control element or layer;
  one or more responsive optical element(s);
  the control element or layer and the responsive optical element(s) moveable in the device relative to one another upon application of an external influence upon the device, to change the distance of separation of the control element or layer from the responsive optical element(s),
  the control element or layer and/or the responsive optical element(s), comprising a material with a surface plasmon resonance that is influenced by proximity of the material to the other of the control element/layer or the responsive optical element(s);
  the relative movement and/or a resulting change of surface plasmon resonance of the material causing a detectable or perceivable change in the optical properties of the device.

Certain other exemplary embodiments provide an optically variable device, the device comprising:
  optically variable device, the device comprising:
  two or more responsive optical elements responsive to changes in their relative positions through the interaction of mutual surface plasmon resonance, each element having altered detectable or perceivable optical properties in the device according to its distance from at least one other responsive optical element, due to an altered degree of exposure to the surface plasmon resonance of the at least one other responsive optical element;
  the responsive optical elements being moveable within the device in terms of their spacing relative to one another, in response to an external influence, to cause a change in perceivable or detectable optical properties of the responsive optical element(s), resulting a change of perceivable or detectable optical properties of the device.

Certain other exemplary embodiments provide a variable device that undergoes a user-detectable tactile change, the device comprising:

a control element or layer;

one or more responsive element(s);

the control element or layer and the responsive element(s) moveable in the device relative to one another upon application of an external influence upon the device, to change the distance of separation of the control element or layer from the responsive element(s), the control element or layer and/or the responsive element(s), comprising a material with a surface plasmon resonance that is influenced by proximity of the material to the other of the control element/layer or the responsive element(s);

the relative movement and/or a resulting change of surface plasmon resonance of the material causing a detectable or perceivable change in the physical properties of the device.

Certainly other exemplary embodiments provide an optically variable device, the device comprising:

a control element or layer comprising a material that is permanently or temporarily electrically charged or polarized such that an electric field emanates from the material;

one or more responsive optical element(s);

the control element or layer and the responsive optical element(s) moveable in the device relative to one another upon application of an external influence upon the device, to change the distance of separation of the control element or layer from the responsive optical element(s), and therefore to change the strength of the electric field impinging upon the responsive optical element(s) from the electrically charged or polarized material of the control element or layer;

the relative movement and/or the change of the strength of the electric field impinging upon the responsive optical element(s) causing a change of perceivable or detectable optical properties of the device.

Certain other exemplary embodiments provide a variable device that undergoes a user-detectable tactile change, the device comprising:

a control element or layer comprising a material that is permanently or temporarily electrically charged or polarized such that an electric field emanates from the material;

one or more responsive element(s);

the control element or layer and the responsive element(s) moveable in the device relative to one another upon application of an external influence upon the device, to change the distance of separation of the control element or layer from the responsive element(s), and therefore to change the strength of the electric field impinging upon the responsive element(s) from the electrically charged or polarized material of the control element or layer;

the relative movement and/or the change of the strength of the electric field impinging upon the responsive elements causing a change of perceivable or detectable physical properties of the device.

Certain other exemplary embodiments provide an optically variable device, the device comprising:

a control element or layer comprising a magnetic material that is permanently or temporarily magnetic, such that a magnetic field emanates from the material;

one or more responsive optical element(s);

the control element or layer and the responsive optical element(s) moveable in the device relative to one another upon application of an external influence upon the device, to change the distance of separation of the control element or layer from the responsive optical element(s), and therefore to change the strength of the magnetic field impinging upon the responsive optical element(s) from the magnetic material of the control element or layer;

the relative movement and/or the change of the strength of the magnetic field impinging upon the responsive optical element(s), causing a change of perceivable or detectable optical properties of the device.

Certain other exemplary embodiments provide a variable device that undergoes a user-detectable tactile change, the device comprising:

a control element or layer comprising a magnetic material that is permanently or temporarily magnetic, such that a magnetic field emanates from the material;

one or more responsive element(s);

the control element or layer and the responsive element(s) moveable in the device relative to one another upon application of an external influence upon the device, to change the distance of separation of the control element or layer from the responsive element(s), and therefore to change the strength of the magnetic field impinging upon the responsive element(s) from the magnetic material of the control element or layer;

the movement of the responsive element(s) and/or the change of the strength of the magnetic field impinging thereupon, causing a change of perceivable or detectable tactile properties of the device.

Further exemplary embodiments provide for a use of any variable device as described herein, as a feature of an item or document.

Further exemplary embodiments provide for an item or document comprising:

a core material; and at least one device as described herein affixed to at least one side or surface of the core material, or at least partially embedded into the core material, such that the device is at least partly visible or detectable from said at least one side.

Further exemplary embodiments provide for a method for producing a variable device, the method comprising the steps of:

providing a control element or layer;

optionally providing a spacer layer on at least portions of the control element or layer;

providing one or more responsive elements optionally in the form of a responsive layer, upon preselected portions of the control element or layer or the spacer layer if present, the responsive element(s) responsive to changes in their distance from the control layer, the control element or layer and the responsive element(s) moveable relative to one another in response to an external influence thereby to cause a change in optical and/or physical properties of the device.

Further exemplary embodiments provide for a method for checking whether an item is a legitimate or counterfeit item, the item comprising at least one device as described herein on at least one side thereof, the method comprising the steps of:

applying an external influence to at least one device; and observing/detecting whether the external influence causes a change in the optical and/or physical properties of the device, wherein an appropriate change is indicative that the item is a legitimate (and not counterfeit) item.

BRIEF DESCRIPTION OF THE DRAWINGS

FIG. 1a illustrates a top plan view of a document incorporating an example optically variable device.

FIG. 1b illustrates a cross-sectional view of a document incorporating an example optically variable device, taken along line A-A' in FIG. 1a.

FIG. 1c illustrates a cross-sectional view of a document incorporating an example optically variable device, taken along line A-A' in FIG. 1a, under mechanical pressure.

FIG. 2a illustrates a top plan view of a document incorporating an example optically variable device.

FIG. 2b illustrates a cross-sectional view of a document incorporating an example optically variable device, taken along line A-A' in FIG. 2a.

FIG. 2c illustrates a cross-sectional view of a document incorporating an example optically variable device, taken along line A-A' in FIG. 2a, under mechanical pressure.

FIG. 5a illustrates a top plan view of a document incorporating an example optically variable device.

FIG. 5b illustrates a cross-sectional view of a document incorporating an example optically variable device, taken along line A-A' in FIG. 5a.

FIG. 6a illustrates a top plan view of a document incorporating an example optically variable device.

FIG. 6b illustrates a cross-sectional view of a document incorporating an example optically variable device, taken along line A-A' in FIG. 6a.

FIG. 7a illustrates a top plan view of a document incorporating an example optically variable device.

FIG. 7b illustrates a cross-sectional view of a document incorporating an example optically variable device, taken along line A-A' in FIG. 7a.

DEFINITIONS

Figure 1:
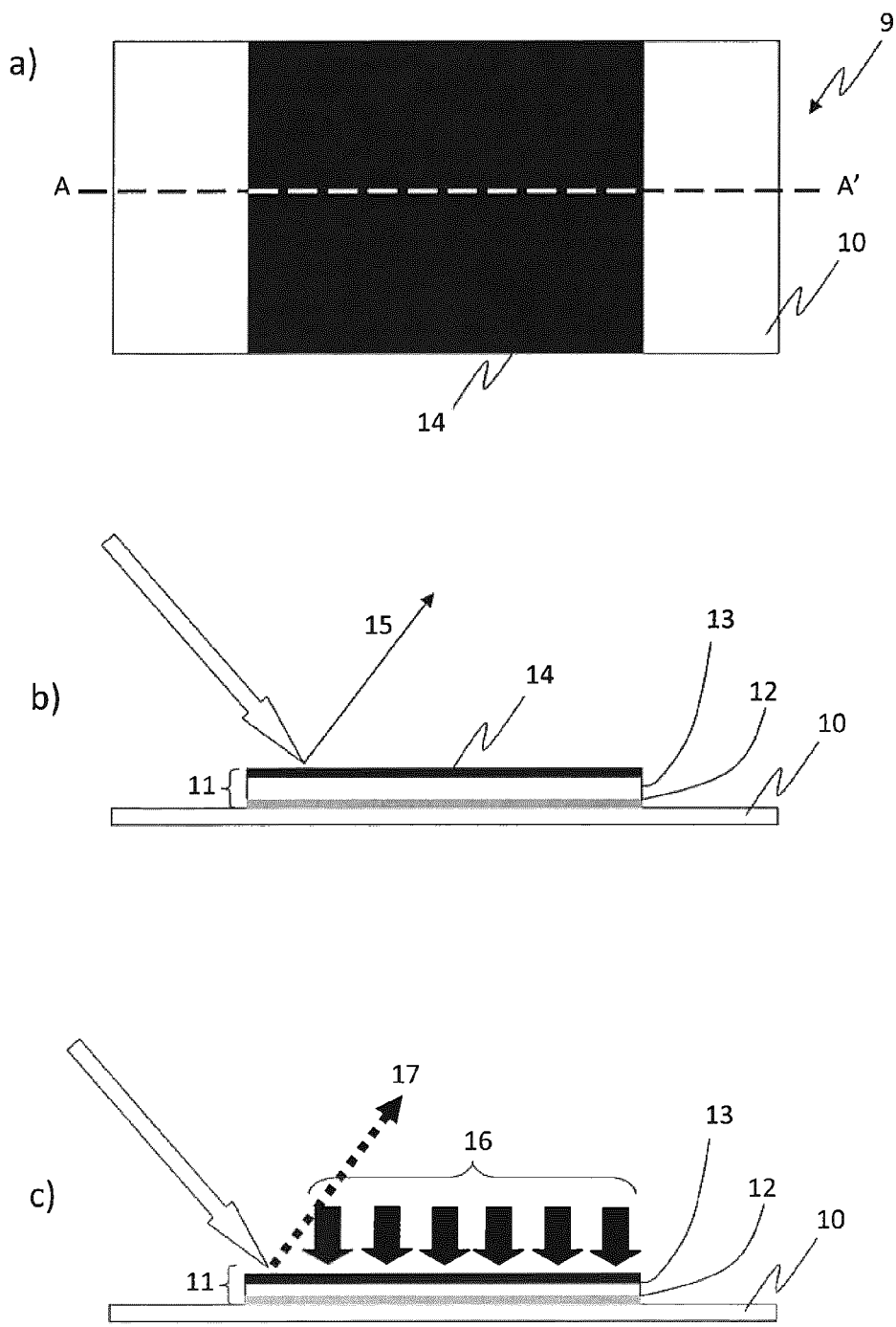

Authentication/security device or feature: refers to any device or feature that may be added to any item or document (e.g. security document) for the purposes of making that item or document more difficult to copy or replicate. An authentication device is one example of a variable device as described herein.

Compressed state: generally refers to a condition of a layer of a device as described herein in which the thickness of at least a portion of the layer is reduced or lessened compared to a "relaxed state" (see below), either as a result of pressure upon the layer (if the layer is deformable), or increased or decreased electrical potential difference across the layer (if the layer is composed of a piezoelectric material), or as a result of any other suitable external influence. For greater certainty, in selected embodiments in which a layer is deformable, the expression "compressed state" refers to a state, shape or thickness of a layer upon application thereto of a mechanical force or pressure, or in the presence of an increased mechanical force or pressure, relative to a relaxed state, to compress or squash the layer such that the thickness of at least a portion of the layer is reduced. In selected embodiments a compressed state is a state that is different to a relaxed state in which the mechanical force or pressure is reduced or absent. A compressed state may be a single state in response to a fixed degree of force or pressure, or may pertain to a range of degrees of deformation in response to a range of degrees of mechanical force or pressure. Moreover, the amount of pressure or force required for a layer to adopt a compressed state may vary according to a degree of deformability of the layer. In further selected embodiments in which a layer comprises a piezoelectric material, a "compressed state" refers to a state, shape or thickness of a piezoelectric layer upon application thereto, or removal therefrom, of an electrical potential difference, or in the presence of an increased or decreased electrical potential difference, relative to a relaxed state, to decrease the thickness or configuration of the layer or at least a portion thereof relative to a relaxed state by virtue of the response of the piezoelectric material to the change in electrical potential difference. Such a compressed state may be a single state in response to a fixed degree of electrical potential difference, or may pertain to a range of degrees of states, shapes or thicknesses in response to a range of degrees of electrical potential difference. Moreover, the amount of electrical potential difference required for a piezoelectric layer to adopt a compressed state may vary according to the piezoelectric properties of the layer. Regardless of whether the layer is mechanically deformable, piezoelectric, or another material able to undergo a change of thickness or configuration, the layer may be sufficiently thin when adopting a compressed state (compared to a relaxed state) to cause adjacent layers disposed or adhered to either side of the layer to interact in some way or to cause elements of the layer to interact with an adjacent layer, such that when adopting the compressed state one or both of the adjacent layers changes its optical appearance compared to the relaxed state, or the elements of the layer itself change their optical appearance. Likewise, the layer may be sufficiently thick when in a relaxed state (compared to a compressed state) to cause adjacent layers disposed or adhered to either side of the layer to interact to a lesser degree, or not to interact at all, such that when adopting a relaxed state one or both of the adjacent layers, or element(s) of the layers, changes its optical appearance compared to the compressed state. Alternatively, the layer may be sufficiently thick when in a relaxed state that elements of the layer are unable to interact with one or more adjacent layers due to the distance of the element(s) from the adjacent layers.

Control element or layer: refers to any element or layer of a device as described herein, which has inherent properties that permit the control element or layer to exert an influence over other layer(s) of the device, or elements thereof, regardless of whether the control layer is or is not directly in contact with such other layer, layers or elements thereof. As used herein, reference to a "control layer" may where appropriate also refer to a "control element" that is not necessarily in the form of a layer but may take some other form, shape or configuration. Otherwise the expressions "control layer" and "control element" are essentially interchangeable in terms of their function in the devices disclosed herein. In selected embodiments, for example, a control element or layer may comprise materials suitable to emit some field such as a magnetic or electric field, wherein the proximity or distance of the control layer from the other layer or layers (or elements of the other layer or layers) affects the strength of the field imposing upon those other layer or layers, and thus the impact of the control layer upon those other layer or layers (or elements thereof). For example, the strength of such a field from a control layer will normally decrease with distance from the control layer. In this way, a control layer may exert an increased or decreased influence upon such other layers, and preferably alter the optical appearance or other physical characteristics of such other layers (or elements thereof), depending upon its distance from the other layers (or elements thereof). In other examples a control layer, and layer or elements to be controlled, may interact by way of surface plasmon resonance (e.g. conductive nanoparticles), wherein again the distance of the control layer from the other layer(s) or their components influences the optical and/or physical properties of the other layer(s) or their components. For greater certainty, a "control element" refers to any element that functions in the same manner as a "control layer" but without necessarily adopting the form, shape, or configuration of a planar or thin layer, but instead refers to any element of any shape or size that has the capacity to "control" the optical or physical characteristics of one or more responsive elements responsive to changes in their distance from the control element.

Core material: refers to any material used to form the main substrate, structure or sheet of any item or document as described herein. In select embodiments, the material may be formed into a sheet or member, and may be composed of a substance selected from but not limited to paper, a plastic, a polymer, a resin, a fibrous material or the like, or combinations thereof. In selected embodiments the core material is of a material suitable for application thereto, either directly or indirectly, of an optically variable device of the types disclosed herein. The optically variable device, or elements thereof, may be applied or attached to the core material in any manner including the use of adhesive materials or layers, such as glues, or by overlaying an adhesive substance, film, varnish or other material over the top of the device or components thereof. The core material may be smooth or textured, fibrous or of uniform consistency. Moreover, the core material may be rigid or substantially rigid, or flexible, bendable or foldable as required by the document. The core material may be treated or modified in any way in the production of the final document. For example, the core material may be printed on, coated, impregnated, or otherwise modified in any other way.

Deform/deformable: any reference to deformation encompasses any change in shape, configuration or thickness of a layer (e.g. an optically responsive layer or spacer layer as defined herein) upon application to the layer or a part thereof of a mechanical force or pressure of any type from any implement (including a finger, plate, or any other item including another portion of a security document or device) by hand manipulation or any mechanical force generated by a machine or lever.

Deformable layer/deformable spacer layer: refers to any layer formed from any material that (1) can be deformed in any way either permanently or temporarily such that the thickness of the layer can be changed between a relaxed state absent an external influence or under less external influence and a compressed state under an external influence or increased external influence, and either (2a) has suitable properties such that when the layer separates a control layer and a responsive layer as described herein, a change in the visual appearance or other physical properties of the responsive layer occurs in at least one of the relaxed and compressed states compared to the other of those states, or (2b) when the deformable layer is a responsive layer comprising responsive elements, the change of thickness of that deformable layer changes a distance of the responsive elements from a control layer so that the optical appearance or physical properties of the responsive elements becomes altered. Preferably a deformable layer is reversibly deformable such that the layer can be transitioned between compressed and relaxed states multiple times upon repeated application and removal of the external influence, or repeated increase and decrease of external influence upon the layer, either directly or indirectly through other layers. The degree of deformability of a deformable layer (in other words the capacity of the layer to be reduced in thickness upon application of mechanical pressure) may be established according to the material used to form the layer. Denser materials may be less inclined to deform compared to less dense materials under the same degree of mechanical pressure. Moreover, a deformable layer may optionally comprise a material comprising voids, pores or cavities preferably too small to be visible to the naked eye, but sufficient to provide space for the remainder of the material of the deformable layer to press into when under mechanical pressure. Examples of materials suitable for use in the formation of deformable layers include but are not limited to flexible materials such as natural rubbers, elastomers, latexes, urethanes, polydimethylsiloxanes and their derivatives (such as Dow Corning's Sylgard 184 commonly used in as a deformable substrate for the technique of micro-contact printing). Furthermore, a deformable layer may optionally comprise or consist of an adhesive material such as but not limited to: acrylated urethanes, methacrylate esters, mercapto-esters and UV curable materials. A deformable layer may be applied under any conditions and in any way. In selected embodiments the layer is applied by printing such as by Gravure printing. Deformable layers are not limited to those that are deformable in response to external influence such as mechanical pressure: other such layers may deform in response to other external influence such as but not limited to heat, light, potential difference. In selected embodiments, a deformable layer may comprise one or more of piezomagnetic materials, magnetostrictive materials, piezoelectric materials. Regardless of the material of the deformable layer or deformable spacer layer, the layer may consist of any deformable material or material that can be caused to change its thickness, shape or configuration. Alternatively the layer may comprise any deformable material combined with non-deformable materials, or may comprise compressible voids, pockets, compartments, vesicles or pores comprising any material, liquid or gas. In some embodiments the layer may be comprised mostly of a gas or gases (e.g. air) with supporting "posts", "columns" or "supports" to maintain one or more voids, pockets or compartments in an open state absence an external influence such as mechanical pressure.

Electrostatic layer/layer from which emanates an electric field: refers to a control layer that comprises a material that inherently exhibits, or can be caused to exhibit, electrostatic properties resulting from charge distribution in the material of the layer. Such materials may comprise, for example, a material selected from but not limited to: a polymer, a plastic, a resin, silica, PTFE, and derivatives thereof. Electrostatic layers may in addition comprise or alternatively comprise an electrets or piezoelectric material. External influence: refers to any influence, force, energy or object that does not form part of or is not derived or derivable from an optically variable device as described herein, but which nonetheless is able to impact upon or influence the device so as to change the optical or other physical properties of the device by causing a change in the dimensions of thickness of one or more layers or elements of the device, or to otherwise cause movement of one or more responsive elements relative to a control layer or element. An external influence may be selected from, but is not limited to: some form of user-derived manipulation of an (e.g. optically) variable device or a document to which the device is applied, or an external influence upon the variable device or a document to which the device is applied from some form of external device adapted to induce the variable device to under an optical or physical change. An external influence may be quite simple, in the form of mechanical pressure from any finger, digit or implement upon an optically variable device, or an increased or decreased potential difference across the device, or any other means to affect a device as described herein.

Item: refers to any object, document, substrate or material to which a device as described herein is applied, either permanently or temporarily. For example, in selected embodiments the item may be subject to counterfeit risks, such that the presence of a device as described herein affixed to the item may be indicative that the item is legitimate and not counterfeit.

Magnetic layer: refers to a control layer that comprises a material that inherently exhibits, or can be caused to exhibit, magnetic properties resulting from charge distribution and/or orientation in the material of the layer. Such magnetic properties may occur because the layer comprises a permanent magnet, or a permanently magnetic material, an electromagnet or an electromagnetic material. Such magnetic materials may comprise, for example, a material selected from but not limited to: Co, Fe, $Fe_2O_3$, $FeOFe_2O_3$, $NiOFe_2O_3$, $CuOFe_2O_3$, $MgOFe_2O_3$, MnBi, Ni, MnSb $MnOFe_2O_3$, $Y_3Fe_5O_{12}$, $CrO_2$, MnAs, Gd, DyEuO, NdFeB, SmCo, and $SmCo_5$, magnetic liquids etc.

Moveable: refers to responsive elements being moveable relative to a control layer, wherein "moveable" encompasses a change in distance (translation) and/or orientation of the responsive elements compared to the control element or layer.

Optical properties: refers to the electromagnetic radiation reflected, transmitted, emitted or otherwise received from a device or element that is visible to the naked eye of an observer, or as observable to an observer with the assistance of a screening or scanning tool. For example, where the optical properties of a device or element, or a change in such properties, are detectable only using incident UV or other beyond visible electromagnetic radiation, a corresponding screening tool may be one that emits UV radiation and directs the radiation onto the device or element under analysis. The optical properties of any device or element thereof as herein described may be caused, influenced or occur due to the material properties of the device or element, the degree of reflection, transmission, absorption, refraction or other modification of electromagnetic radiation incident thereupon, and may also depend upon the orientation, shape, structure, nanoscale properties, or other material properties of the device or element when taken alone or in combination with other devices, elements or device components.

Responsive optical element: refers to any element, feature, layer, particle, molecule, component, portion, vesicle, pixel, compartment or other discrete aspect embedded or otherwise forming a part of an optically or physically variable device as disclosed herein, or a layer thereof, the position of which, and the distance and/or orientation of which relative to a control element or layer, can be changed according to other features of the device, wherein such a change in the position or distance of the responsive optical element from the control element or layer causes a change in the optical appearance or optical properties of the responsive optical element. Such optical changes may be permanent or reversible, visible to the naked eye or visible with the assistance of a screening tool or device. In select embodiments, a responsive optical element may be a single element and/or comprise the entirety of an optically responsive layer. Thus, in select embodiments, a responsive optical element refers to either a single or multiple elements of any type and configuration that can under an optical change according to its/their proximity to a control layer, and thus according to an increased or decreased influence of the control layer. A responsive optical element may comprise a single uniform or non-uniform layer of material that itself undergoes the optical change, or may pertain to a plurality of discrete compartments or particles embedded, suspended or incorporated into an optically responsive layer which themselves undergo an optical change under an increased or decreased level of an external influence. For example, such responsive optical elements may comprise solid particles, conductive nanoparticles, encapsulated particles optically containing a liquid, or compartments or pixels in a layer each optionally containing particles. In selected embodiments, the optically variable devices disclosed herein are of a thin-film configuration, or generally thin and flat yet flexible such that they are amenable to application to a flexible, thin substrate such as paper or polymer sheets. In some of these embodiments the devices may have a thickness of less than 1000 µm, less than 100 µm, less than 10 µm or less than 1 µm. Select forms of responsive optical elements may include those that undergo a change of orientation upon user-manipulation of a related device may comprise for example "flakes" of material; for example optical interference structures comprising laminate Bragg-stacked or Fabry-Perot structures. A "responsive element" without recitation of the term "optical" refers to an element that otherwise corresponds to an "responsive optical element" but which may undergo a change that is not optical, visually discernable or detectable, but some other change such as a change in physical properties depending upon proximity of the responsive element to a control element or layer.

Optically responsive layer: refers to any layer forming part of an optically variable device as described herein, that is responsive to an influence exerted upon the optically responsive layer by a control layer, such that an increased influence by the control layer gives rise to a change in optical appearance or properties of the optically responsive layer (or responsive optical elements thereof) compared with a decreased influence by the control layer. Such a change in optical appearance or properties may be apparent to the naked eye, or may only be apparent to a human with the assistance of some form of viewing device, for example to magnify a portion of the optically responsive layer, or to apply to the layer some form of electromagnetic radiation that is beyond the visible light range. Thus, an optically responsive layer may comprise any structure, components, materials or elements that undergo a change in appearance for example under increased or decreased influence of a magnetic or electric field, or plasmon resonance, for example caused by a change in the proximity of the source of the field or resonance relative to the optically responsive layer (or responsive optical elements thereof). Examples of such structures, components or materials suitable for use in optically responsive layers may include, but are not limited to, materials that contain freely suspended or flowable magnetic or electrostatic nanoparticles, optionally contained within fluid-filled compartments.

Optically variable device: refers to any device as disclosed herein at least comprising: a control layer (or one or more control elements); one or more responsive optical element(s) such as responsive optical elements that are responsive to changes in their distance from the control layer or control element(s), and moveable in response to an external influence to increase and/or decrease a distance of the element(s) from the control layer or control element(s), thereby to cause a change in optical appearance or other physical properties of the device. In selected embodiments, optically variable devices comprise at least two layers including a control layer and an optically responsive layer comprising the responsive optical element or elements. The responsive optical element could also be in the form of a single layer making up the optically responsive layer, or alternatively may be a layer comprising discrete elements or particles that make up the responsive optical elements as described herein. In select embodiments, the optically responsive layer may itself undergo a change in conformation, shape or thickness in response to an external influence, thus to alter a proximity of the optically responsive layer (or elements thereof) to the control layer. Alternatively, or in addition, a spacer layer may be present between the control layer and the responsive layer, the thickness, shape or configuration of which may be altered in response to the external influence, thus to alter a proximity of the responsive layer (or elements thereof) to the control layer. Other embodiments of optically variable devices are also described. Perceivable or detectable change (of optical and/or physical properties of a device): refers to any change that occurs to a device as described herein, that may be perceived by the user of a device (through sight, touch etc.) or which is detected for example by a user of the device with the assistance of a screening tool. To provide just one example, a change of optical properties of a device might occur only in the beyond visible spectrum of electromagnetic radiation, in which case a user of the device may choose to employ a UV screening tool to detect a corresponding change in optical properties.

Piezoelectric layer: refers to any layer formed from any material that: (1) can undergo a change of shape, thickness, configuration or form, either permanently or temporarily, under conditions of an electrical potential difference, an increased electrical potential difference, or decreased electrical potential difference, by virtue of the piezoelectric properties of the materials of the layer. For example, the thickness of the layer may be changeable between a 'relaxed' state absent electrical potential difference, (or under less electrical potential difference) and a 'compressed' state under increased electrical potential difference, and (2) has suitable optical properties such that when the layer separates a control layer and an optically responsive layer as described herein, a change in the thickness of the layer causes a change in the optical properties of the optically responsive layer resulting from a change in the proximity of the optically responsive layer relative to the control layer. Alternatively, a piezoelectric layer may form part or all of a control layer or an optically responsive layer. Preferably the piezoelectric layer is reversibly changeable such that the layer can be transitioned between relaxed and compressed states multiple times upon repeated application and removal of the electrical potential difference, or repeated increase and decrease of electrical potential difference. The shape or thickness change of the piezoelectric layer (for example the capacity of the layer to be reduced or increased in thickness depending upon electrical potential difference) may be established according to the material used to form the layer. For example, different polymers or crystals may be less or more inclined to change shape or thickness compared to other materials under the same degree of electrical potential difference. Examples of materials suitable for use in the formation of piezoelectric layers include but are not limited to ferroelectric and pyroelectric materials such as poly (vinylidene fluoride) (PVDF) and its copolymer with trifluoroethylene P(VDFTrFE). The piezoelectric layer may alternatively be made of materials in polyvinylidene difluoride (PVDF) or PVDF derivatives. In one example, the piezoelectric layer may be made of poly (vinylidene fluoride-trifluoroethylene) (P(VDF-TrFE)) or poly(vinylidene fluoride/tetrafluoroetbylene) (P(VDF-TeFE)). In other examples, the piezoelectric layer may be made of a blend of a material in PVDF or PVDF derivatives and at least one of lead zirconate titanate (PZT) fibers or particles, polymethylmethacrylate (PMMA), or poly(vinyl chloride) (PVC). Inorganic materials that can deposited by vacuum deposition or sol gel process including lead zirconate titanate (PZT) and barium titanate, and zinc oxide may also be used. Further examples of materials suitable to used as a component material for the piezoelectric layer include, but are not limited to, those disclosed in Chu et al. (2006) Science, Vol. 313, pages 334-336, and Bauer et al. Dielectrics and Electrical Insulation, IEEE Transactions Publication Date: October 2006 Volume: 13 Issue: 5, pages: 1149-1154, both of which are incorporated herein by reference. Furthermore, a piezoelectric layer may optionally comprise or consist of an adhesive material such as but not limited to: acrylated urethanes, methacrylate esters, mercapto-esters and UV curable materials. A piezoelectric layer may be applied under any conditions and in any way. In selected embodiments the layer is applied by printing such as by Gravure printing. Moreover, the piezoelectric properties of a piezoelectric layer may be imparted to the layer either before, during or after its application or formation upon a reflector or absorber layer, in accordance with the teachings herein. In one example of a piezoelectric layer, when an electric field having the same polarity and orientation as the original polarization field is placed across the thickness of a single sheet of piezoceramic, the piece expands in the thickness or "longitudinal" direction (i.e. along the axis of polarization). At the same time, the sheet contracts in the "transverse" direction (i.e. perpendicular to the axis of polarization). When the field is reversed, the motions are reversed. Sheets and plates utilize this effect. The motion of a sheet in the thickness direction may at least in some embodiments be extremely small (in the order of tens of nanometers). For example, in accordance with the security devices and documents disclosed herein a thickness change in the order of tens of nm may be suitable for operation or optical change of the device since it will represent a 5-8% change in thickness for the spacer layer. On the other hand, since the length dimension is often substantially greater than the thickness dimension, the transverse motion is generally larger (on the order of microns to tens of microns). The transverse motion of a sheet laminated to the surface of a structure can induce it to stretch or bend, a feature often exploited in structural control systems. A piezoelectric layer may also be used to provide an electrically charged layer for use as a control layer.

Polymer core material: refers to any polymer or polymer-like substance suitable to form a core material in the form of a sheet-like configuration to be formed or cut into a size suitable for use in various items and documents. The polymer core material may be a substantially uniform sheet of polymer material, or may take the form of a laminate structure with layers or polymer film adhered together for structural integrity, such as disclosed for example in international patent publication WO83/00659 published Mar. 3, 1983, which is incorporated herein by reference. A polymer core material may also comprise a material that includes a polymer in combination with other materials such as plastic or paper to form a hybrid core material.

Reflected light: refers to light incident upon a surface and subsequently 'bounced' or otherwise reflected by that surface such that the reflected light is visible to the naked eye or detectable by a suitable means. The degree of light reflection may vary according to the surface, and the degree of light that is not reflected by the surface because it is scattered by, diffracted by, absorbed by, or transmitted through the surface and the material of the substrate.

Relaxed state: in selected embodiments that employ a deformable layer, the expression "relaxed state" refers to a state, shape or thickness of a deformable layer absent an external influence, or as a result of a reduced external influence, upon the layer. For example, if the external influence comprises a mechanical force or pressure upon the layer, then a relaxed state may be present under a reduced mechanical force or pressure relative to that applied to achieve a 'compressed' state. In selected embodiments a relaxed state is any state that is different to a compressed state in which a mechanical force or pressure is present or increased upon the layer relative to a relaxed state. Such a relaxed state may be a single state in response to a fixed degree of force or pressure (or no force or pressure), or may pertain to a range of degrees of deformation in response to a range of degrees of mechanical force or pressure. Moreover, the amount of pressure or force required for a deformable layer to adopt a relaxed state may vary according to a degree of deformability of the layer. In further selected embodiments in which a layer is a piezoelectric layer comprised of a piezoelectric material, a "relaxed state" refers to a state, shape or thickness of a piezoelectric layer upon removal of an electrical potential difference, or in the presence of an decreased electrical potential difference, relative to a compressed state, to change, alter, increase, or decrease the state, shape, thickness or configuration of the layer in at least a portion thereof relative to a compressed state. In selected embodiments a relaxed state is a state that is different to a compressed state in which the electrical potential difference is present or increased. Such a relaxed state may be a single state in response to a fixed degree or absence of electrical potential difference, or may pertain to a range of degrees of states, shapes or thicknesses in response to a range of degrees of electrical potential difference. Moreover, the amount of electrical potential difference required for a piezoelectric layer to adopt a relaxed state may vary according to the piezoelectric properties of the layer. Regardless of whether a layer is mechanically deformable or piezoelectric or other type, the layer may be sufficiently thin in said compressed state (compared to the relaxed state) to cause an adjacent layer (e.g. a magnetic layer and an optically responsive layer) disposed or adhered to either side of the layer, or elements in that layer, to interact in some way with another layer present, such that when adopting the compressed state one of the adjacent layers (or elements thereof) changes its optical appearance compared to the relaxed state. Likewise, the layer may be sufficiently thick when in a relaxed state (compared to a compressed state) to cause an adjacent layer disposed or adhered to either side of the layer, or elements of that other layer, to interact to a lesser degree, or not to interact at all, such that when adopting a relaxed state one of the adjacent layers (or elements thereof) changes its optical appearance compared to the compressed state. The same applies if a deformable, piezoelectric material is used to form an optically responsive layeroptically responsive layer as described herein, optionally with embedded or included responsive optical elements: the thickness of the optically responsive layeroptically responsive layer as influenced by an external influence may change, thus changing the distance of the responsive optical elements to an adjacent control layer.

Responsive element: encompasses responsive optical elements as described herein, as well as any other feature or element of a device as described herein that can undergo a user-detectable e.g. physical change upon user-manipulation of the devices as described herein. For example, responsive elements may alternatively comprise, but are not limited to, tactile elements that undergo a change in texture, thickness or contour that are detectable by touch of the user.

Security document: refers to any document, item or article of manufacture of any importance or value, which might be subject to or susceptible to counterfeit copying. In selected embodiments, a security document may include features or devices intended to show that the document, item or article is a genuine and legitimate version, and not a counterfeit copy of such a document, item or article. For example, such security documents may include security features such as those disclosed herein. Such security documents may include, but are not limited to, identification documents such as passports, citizenship or residency documents, drivers' licenses, bank notes, cheques, credit cards, bank cards, and other documents, as well as labeling or other security features, for items of monetary value such as designer clothing, accessories, or any other branded products where it is desired to indicate or demonstrate the authenticity or legitimacy of the product compared to a counterfeit copy. Such security features may be permanently or removably incorporated therein depending upon the nature of the document, item or article, and the intended end user.

Spacer layer: refers to any layer that spaces a first layer on one side of the spacer layer from another second layer on a side of the spacer layer opposite to the first layer. Any spacer layer herein described may comprise or consist of any deformable layer or deformable spacer layer as herein described. Regardless of the material of the spacer layer, the layer may optionally consist of any deformable material or material that can be caused to change its thickness, shape or configuration. Alternatively the layer may comprise any deformable material combined with non-deformable materials, or may comprise compressible voids, pockets, compartments, vesicles or pores comprising any material, liquid or gas. In some embodiments the layer may be comprised mostly of a gas or gases (e.g. air) with supporting "posts", "columns" or "supports" to maintain one or more voids, pockets or compartments in an open state absence an external influence such as mechanical pressure.

Transmitted light: refers to light that is incident upon a surface, layer or multiple layers, of which a portion of the light is able to pass through and/or interact in some way with the surface, layer or layers by transmission. Light may be transmitted through a layer or layers by virtue of the layer or layers not being entirely opaque, but instead permitting at least a portion (e.g. 0-99%) of the incident light to be transmitted through the layer or layers in view of the layer or layers exhibiting at least some degree of translucency.

Window: refers to a region or portion of a security document in which a component of a security device is exposed for visual inspection, because there is little or no translucent or opaque material to obscure the view of the exposed portions. A window may be present even if there are transparent or translucent layers, for example of film, to cover the security device or components thereof, because the exposed portions of the security device are still visible, at least in part, through the film. In further selected embodiments as disclosed herein 'window' refers to one or more portions of a security device as disclosed herein in which a masking layer does not extend across the entire surface of a security device, such that portions of the security device are exposed for visual inspection in reflective light. A window may also refer to a clear or transparent or translucent region of a substrate, for example for viewing therethrough other parts of a security document when the document is folded or manipulated.

DETAILED DESCRIPTION OF THE INVENTION

Disclosed herein are devices that are useful for a broad range of applications including, but not limited to, displays for devices and documents, magazines, books or other items with user-manipulated content, and advertizing billboards. In further applications, the devices may be used as authentication devices for any items such as for example security documents such as passports, credit cards and bank notes to help prevent counterfeit. In selected embodiments the devices may be especially amenable to large-scale production, and yet include materials and/or structural configurations that are difficult to replicate without prior knowledge of the nature of the component materials and their dimensions. Herein described are devices that, at least in selected embodiments, comprise laminate or layered structures that, at least in selected embodiments, give rise to a wide range of optical variability, including colour-changes, appearance of content including text and images, or even moving images according to the application and configuration of the device. In other embodiments the devices may exhibit changes in texture or contour (or other changes sensed for example by the touch of a user) in addition to or instead of optical variability. The invention encompasses the devices themselves, their structures, as well as methods for their manufacture and their use.

In selected embodiments the devices may include a material that is deformable in some way, wherein the deformation of the material causes a change in the proximity and/or orientation of one or more responsive elements relative to a control element or layer, or relative to one another, which in turn causes a change in the properties of the responsive element(s) that is detectable by a user or observer of the device in some way.

In particular, the inventors have endeavored to develop devices that exhibit user-sensed features that can be altered or selectively activated according to user-manipulation of the device, either by hand and/or with the assistance of a screening tool or device. To this end some of the devices disclosed herein comprise at least one layer of material that can be deformed, squashed, expanded or caused in some other way to change in thickness upon application to the device of an external influence such as mechanical pressure, or some other influence such as a change in potential difference across the device. Such deformation or change enables the device to adopt alternative optical or other properties according to whether the material of the layer is in a 'relaxed' state under reduced external influence or absent the external influence, or alternatively whether the material of the spacer layer is in a 'compressed' state under increased degrees of the external influence (at least compared to a relaxed state). In any embodiments described below or herein, any reference to responsive optical elements or layers, or any references to changes in optical properties, may be substituted with alternative means to achieve changes in physical properties of the devices disclosed.

Thus, the optically variable devices disclosed herein at least in selected embodiments may comprise at least one layer of any material, wherein at least a portion of the layer undergoes a change in thickness once an external influence of some kind is imposed upon, or increased upon, the layer, either directly or through other layers. Such external influences may include, but are not limited to, mechanical forces and pressures upon the layer (especially where the layer comprises a deformable material) or the application of a potential difference or increased potential difference across the layer (for example where the layer comprises a piezoelectric material).

In selected embodiments of the devices disclosed herein, the layer may include a spacer layer that at least in part separates, or is otherwise disposed between, other layers of the device, wherein the other layers may be caused to interact in some way with one another depending upon the thickness of the spacer layer. For example, one of the other layers may comprise a "control layer" juxtaposed with or adhered to the spacer layer, wherein the control layer affects one or more other layers of the device, or components of those layers, according to its relative proximity to those other layers or components.

In selected embodiments, responsive optical elements may be in the form of, or be part of, an optically responsive layer (or other responsive layer), which may be juxtaposed with or adhered to the spacer layer, on an opposite side of the spacer layer compared to the control layer, thus to form a layered or laminate structure with the spacer layer separating the control and optically responsive layers. The optically responsive layer may comprise any material, structure or form that can undergo any change in appearance when under the influence of the control layer. Therefore, the optically responsive layer may adopt a particular appearance upon visual inspection thereof (or upon inspection with the aid of a viewing device or tool) when the spacer layer adopts a relatively thick or "relaxed" configuration. However, when the spacer layer is caused to become thinner by some external influence, the optically responsive layer is brought into closer proximity with the control layer. This in turn may cause the optically responsive layer to be exposed to an increased influence from the control layer, which in turn may be sufficient for the optically responsive layer to exhibit alternative optical properties upon visual inspection thereof (or upon inspection with the aid of a viewing tool or device).

Thus selected embodiments, which will become more apparent from the foregoing examples, may comprise devices with three layers: a control layer, a spacer layer, and an optically responsive layer, which interact with one another in a specific manner. However, the invention is not limited in this regard: other embodiments may simply include optically variable devices comprising:

a control element or layer; and
one or more responsive optical element(s) responsive to changes in their spatial separation from the control layer, the control element or layer and the responsive optical element(s) moveable relative to one another in response to an external influence to increase and/or decrease a distance of the element(s) from the control layer, thereby to cause a change in optical appearance of the element(s) resulting a change of optical appearance of the device.

Such embodiments may include, for example, two-layer devices comprising a control layer and responsive optical elements that form or form part of an optically responsive layer, wherein the optically responsive layer itself can be caused to undergo a change of shape, thickness or configuration in response to an external influence sufficient to change a proximity of the optically responsive layer, or elements thereof, relative to the control layer, so that the device undergoes an optical change.

Optionally, the responsive optical element or elements may comprise a thin-film reactive layer, at least a portion of which comprises an optically responsive material. In this way, a single layer of thin-film material that is able to change its appearance, at least in part, depending upon its proximity or distance from the control layer. However, in other embodiments the responsive optical element or elements may comprise a plurality of particles, molecules or compartments encapsulated in an optically responsive layer discrete from the control layer, wherein the thickness of the optically responsive layer is altered by the external influence, thereby to increase and/or decrease a distance of the particles, molecules or compartments containing them from the control layer, which in turn causes a change in the appearance of the particles, molecules or compartments containing them, and thus the appearance of the optically responsive layer.

Optionally, any of the optically variable devices disclosed herein may comprise an optically responsive layer comprising the responsive optical element or elements, and a spacer layer between and attached to the control layer and the optically responsive layer, the thickness of which is dependent upon an external influence. In this way the appearance of the spacer layer may be altered by the external influence causing a change in the proximity or distance of the responsive optical element(s) from the control layer.

The embodiments disclosed herein are not limited with regard to the nature of the control element or layer, nor the spacer layer (if present) nor the optically responsive layer or elements thereof that 'respond' to the relative proximity of the control element or layer. Indeed, further embodiments encompass any layers or components thereof that, when positioned appropriately, react in some way to cause an optical change in the responsive optical element(s) either individually or when viewed collectively in the device, or an optically responsive layer comprising such elements, resulting from the change in the spatial separation of the element(s) from the control layer. Moreover, the embodiments described herein are not limited to the use of one or more responsive optical elements or layers comprising them that undergo a visual change that can be detected by a human eye. Indeed, selected embodiments may comprise responsive optical elements or layers that undergo a microscopic change of optical properties and/or a change that is only visible with the aid of a viewing device or tool, such as may be required under conditions of electromagnetic radiation beyond visible light. Selected embodiments will also become more apparent from the foregoing.

Therefore, the optical properties of the responsive optical elements, or an optically responsive layer comprising such elements, and/or any change of such optical properties, may be macroscopic, microscopic, or observable in visible light conditions or beyond visible light conditions.

The embodiments disclosed herein are also not limited in terms of the nature of the control layer, and the way it exhibits an influence over the optical properties of the responsive optical element(s) or an optically responsive layer comprising such element(s). Selected embodiments involve magnetism.

For example, selected embodiments provide an optically variable device, the device comprising:

a control element or layer comprising a magnetic material that is permanently or temporarily magnetic, such that a magnetic field emanates from the material;

one or more responsive optical element(s);

the control element or layer and the responsive optical element(s) moveable in the device relative to one another upon application of an external influence upon the device, to change the distance of separation of the control element or layer from the responsive optical element(s), and therefore to change the strength of the magnetic field impinging upon the responsive optical element(s) from the magnetic material of the control element or layer;

the relative movement and/or the change of the strength of the magnetic field impinging upon the responsive optical element(s), causing a change of perceivable or detectable optical properties of the device.

For example, an optically variable device as described herein may include a control element or layer composed at least in part of a magnetic material from which emanates a magnetic field. In such embodiments, the responsive optical element(s) (or optically response layer comprising such elements) may comprise a material or structure the optical properties of which depend upon a strength of the magnetic field impinging thereupon from the magnetic material of the control layer. Upon manipulation of the device, a user in some way (e.g. by hand or with the aid of an external device or tool, or some other external influence) may change the proximity or distance of the responsive optical element(s) (or optically responsive layer comprising such elements) to the control layer, which in turn alters the strength of the magnetic field impinging upon the responsive optical elements sufficient to change their optical properties. Optionally, the control layer comprises a permanent magnet, or a permanently magnetic material. Alternatively, the control layer may comprise an electromagnet or an electromagnetic material. For example, electromagnets and electromagnetic materials may be energized by any means such an external microwave source. Electromagnetics may for example be integrated into selected versions of the devices in connection with an internal or integrated battery, such as a printed battery.

In further examples, the magnetic material of the control layer may be selected from one or more of: Co, Fe, $Fe_2O_3$, $FeOFe_2O_3$, $NiOFe_2O_3$, $CuOFe_2O_3$, $MgOFe_2O_3$, MnBi, Ni, MnSb $MnOFe_2O_3$, $Y_3Fe_5O_{12}$, $CrO_2$, MnAs, Gd, DyEuO, NdFeB, SmCo, and $SmCo_5$.

When the optically variable device comprises a control layer itself comprised of a magnetic material, the responsive optical element(s) may comprise any layer or structure that undergoes a change of optical properties when the magnetic field impinged thereupon from the control layer is altered, for example in terms of an increased or decreased flux density.

In alternative embodiments to those involving magnetism, the control layer may comprise an electrically charged material from which emanates an electric field. Moreover, the responsive optical element(s) (or optically response layer comprising such element(s)) may comprise a material or structure the appearance of which depends upon a strength of the electric field impinging thereupon from the electrically charged material of the control layer. In this way, a change in the thickness of the spacer layer may alter the strength of the electric field impinging upon the optically responsive layer sufficient to cause a change in the optical properties of the responsive optical element(s) (or optically response layer comprising such elements).

For example, related exemplary embodiments may provide an optically variable device, the device comprising:

a control element or layer comprising a material that is permanently or temporarily electrically charged or polarized such that an electric field emanates from the material;

one or more responsive optical element(s);

the control element or layer and the responsive optical element(s) moveable in the device relative to one another upon application of an external influence upon the device, to change the distance of separation of the control element or layer from the responsive optical element(s), and therefore to change the strength of the electric field impinging upon the responsive optical element(s) from the electrically charged or polarized material of the control element or layer;

the relative movement and/or the change of the strength of the electric field impinging upon the responsive optical element(s) causing a change of perceivable or detectable optical properties of the device.

For example, in any embodiments involving an electric field, the control layer may comprise any material that is able to obtain, retain, or adopt an electric charge or polarization by any means. For example, electrically insulating materials may be suitable that exhibit, or can be caused to adopt, a positive or negative electric charge sufficient to generate the electric field. In selected embodiments, such control layers may comprise at least one of: a polymer, a plastic, a resin, silica, and derivatives thereof, an electret or piezoelectric material. Moreover, for such embodiments the responsive optical element or elements may comprise electrochromic, electrostatic, polarizable or polarized, optionally encapsulated particles, particles with a permanent or induced dipole moment, or other suitable materials that are able to change their appearance, orientation or configuration in the device according to their distance from a control element or layer that produces an electric field. Examples may include, but are not limited to, freely-rotatable optionally polarizable particles or molecules, embedded liquid crystal microcapsules, electrochromic materials (e.g. with optional charge transfer between active materials and an ion reservoir), or Janus particles. In some examples, the control element or layer may comprise at least one of: a polymer, a plastic, a resin, silica, PTFE, and derivatives thereof.

In yet further embodiments of the optically variable devices, surface plasmon resonance and corresponding interaction between a control layer and responsive elements can result in changes in the optical properties of the device.

For example, certain exemplary embodiments provide an optically variable device, the device comprising:

a control element or layer;

one or more responsive optical element(s);

the control element or layer and the responsive optical element(s) moveable in the device relative to one another upon application of an external influence upon the device, to change the distance of separation of the control element or layer from the responsive optical element(s), the control element or layer and/or the responsive optical element(s), comprising a material with a surface plasmon resonance that is influenced by proximity of the material to the other of the control element/layer or the responsive optical element(s); the relative movement and/or a resulting change of surface plasmon resonance of the material causing a detectable or perceivable change in the optical properties of the device.

In just one example, surface plasmon resonance may cause migration and/or rotation of conductive nanoparticles suspended in gas and/or liquid-encapsulated in vesicles or compartments in an optically responsive layer, whereupon a change in the distance of the conductive nanoparticles from the control layer results in an optical change in the optically responsive layer caused by the migration and/or rotation. For example, the control element or layer may comprise an electrically conductive material, and optionally the responsive optical elements may comprise conductive particles, conductive nanoparticles, nonconductive particles, or nonconductive nanoparticles.

In any of the embodiments described, the responsive optical elements may optionally be caused to undergo at least partial rotation and/or translation when the device is exposed to the external influence, the responsive optical elements optionally undertaking such rotation and/or translation in fluid retained within the device. For example a device may comprise charged particles suspended in a fluid (including gases, liquids and mixtures thereof), wherein the particles can be caused to move (migrate and/or rotate) by electrophoresis or other induced migration in the liquid in response to their exposure to an increased magnetic or electric field, or surface plasmon resonance, caused by a change in a spatial separation of the responsive element(s) from the control element or layer.

In any of the embodiments described, the responsive optical elements may be encapsulated in a discrete layer (e.g. optically responsive layer) from the control layer, the thickness of which is varied by the external influence, thereby to increase and/or decrease the distance of separation of the particles and the control element or layer. Alternatively, or in addition, a spacer layer may be present between the control element or layer and the responsive optical element(s), which itself may vary in thickness according to the external influence.

The capacity of an optically responsive layer and/or a spacer layer (if present) to alter its thickness or configuration may be achieved via any means, and via the use of any materials that can be caused to adopt an altered thickness in response to any external influence. For example, in selected embodiments a deformable layer may comprise any deformable material, changeable between a relaxed state with no or less mechanical pressure upon the layer, and a compressed state upon increased mechanical pressure upon the layer, wherein the reduction in thickness of the layer may be sufficient to cause a change of optical properties of the responsive optical element or elements present in the device. For example, a deformable layer may optionally comprise at least one adhesive material selected from acrylated urethanes, methacrylate esters, mercapto-esters and a UV curable adhesives. Such adhesive materials may not only assist in the adhesion of the layers forming the optically variable device, but also may provide materials with desirable deformability when under mechanical pressure or stress.

In other embodiments, a deformable layer may be formed on the control layer, or indeed another layer, by a printing technique such as Gravure printing. In this way, the deformable layer may be applied on only select portions of the device, or on select portions in different thicknesses, thus to provide a pattern, or content, to the device before and/or after the application of mechanical pressure. Thus, a deformable spacer layer may have a non-uniform thickness when in said relaxed and/or said compressed state, such that different parts of the responsive optical element or elements (or an optically responsive layer comprising such elements) exhibit different optical properties in the relaxed and/or compressed state according to their distances from the control layer.

If an optically responsive layer or a spacer layer (any layer) comprises a deformable material then it may be deformable only once such that it does not regain its original shape and form once the mechanical pressure has been removed. However, in other embodiments a deformable layer may be resiliently deformable so that it may cycle multiple times between compressed and relaxed states. Moreover, once the mechanical pressure is removed the deformable layer may relax to its original shape and form (prior to the application of mechanical pressure) very slowly or very quickly depending upon the application. For example, the spacer layer may transform from a compressed to a relaxed state in from 0.000001 to 1000 seconds, preferably from 0.001 to 120 seconds.

Selected materials for a deformable layer may include a plurality of pores or voids that reduce in volume when mechanical pressure is applied to the device thereby to assist compression of the deformable spacer layer from a relaxed state to a compressed state. Such pores or voids may be small or microscopic, or comprise voids or compartments in the layer that comprise the majority of the volume of the layer, with posts, columns or supports of material defining the voids or compartments.

In still further embodiments of the optically variable devices, a spacer layer (if present) or an optically variable layer may comprise a piezoelectric material changeable between a relaxed state and a compressed state upon a change in electrical potential difference across the device, resulting in a change in optical properties of the device. For example, a piezoelectric layer may adopt a relaxed state absent any electric potential difference across the layer.

Optionally, a spacer layer (if present) or an optically variable layer may comprise a piezoelectric material, comprising a crystal or polymer, and optionally at least one adhesive material selected from acrylated urethanes, methacrylate esters, mercapto-esters and a UV curable adhesives.

As with any deformable layer, any piezoelectric layer may optionally be formed by any printing technique such as Gravure printing. For example, selected piezoelectric layers may have a non-uniform thickness when in said relaxed and/or said compressed state, such that different parts of the optically responsive layer exhibit different optical properties according to their distances from the control layer.

Still further embodiments provide an optically variable device, the device comprising:

two or more responsive optical elements responsive to changes in their relative positions through the interaction of mutual surface plasmon resonance, each element having altered detectable or perceivable optical properties in the device according to its distance from at least one other responsive optical element, due to an altered degree of exposure to the surface plasmon resonance of the at least one other responsive optical element;

the responsive optical elements being moveable within the device in terms of their spacing relative to one another, in response to an external influence, to cause a change in perceivable or detectable optical properties of the responsive optical elements, resulting a change of perceivable or detectable optical properties of the device. In such embodiments, the external influence may for example cause the two or more responsive optical elements to organize into an array of elements, or to become disorganized in the device, depending upon the presence or degree of the external influence upon the device, thereby giving rise to a change of optical appearance of the device. For example, the external influence may cause a change in the separation of two or more elements resulting in a change of optical appearance of the device.

In such embodiments, the external influence may optionally cause a change in the orientation of two or more elements, resulting in a change of optical appearance of the device. Optionally the elements are conducting particles.

Optionally the elements are nanoparticles.

Optionally the elements are conducting nanoparticles.

Optionally the elements are a combination of conducting and non-conducting particles.

Still further example devices may undergo a physical, tactile change rather than, or in addition to, an optical change. In any of the embodiments described herein that refer to responsive optical elements or layers, or which refer to an optical change of the device, any reference to optical responsiveness or optical changes may be substituted by physical changes to the device (e.g. that can be detected by touching or feeling the device). For example other embodiments encompass a variable device that undergoes a user-detectable tactile change, the device comprising:

a control element or layer;

one or more responsive element(s);

the control element or layer and the responsive element(s) moveable in the device relative to one another upon application of an external influence upon the device, to change the distance of separation of the control element or layer from the responsive element(s), and therefore to change a degree of influence of the control element or layer upon the responsive optical element(s), to cause a change of perceivable or detectable physical properties of the device.

For example, the user-detectable change may comprises a change in the thickness, texture, or prominence of the device or portions thereof, optionally combined with a change in the optical properties or appearance of the device.

Still further embodiments provide for a use of any device described herein, as a feature of any type of item or document. Such documents may be selected from, but are not limited to, paper document, books, magazines, advertisements, billboards, identification documents such as passports, citizenship or residency documents, drivers' licenses, bank notes, cheques, credit cards, bank cards, and other documents, as well as labeling or other security features, for items of monetary value such as designer clothing, accessories, or any other branded products where it may be desired to indicate or demonstrate the authenticity or legitimacy of the product compared to a counterfeit copy.

Thus, in further embodiments there are provided any "items" comprising:

a core material; and at least one device as described herein affixed to at least one side of the core material, or at least partially embedded into the core material, such that the device is at least partly visible or detectable from at least one side of the core material. Depending upon the application, the core material may comprise at least one material selected from the group consisting of: paper, polymer, plastic, and combinations or hybrids thereof, and any other suitable core materials.

In selected embodiments, the item may further comprise a portion to be contacted with the device, thereby to cause a change in the optical or physical properties of the device resulting from a change in distance of the responsive element(s) from the control layer of the device. For example, in the case of a security document, a portion of the document may be adapted to be pressed against an optically variable device, and may optionally comprises intaglio printing, thereby to provide a raised, optionally patterned, region as a pressure template to achieve the change in visible appearance of the device. Alternatively, or additionally, the portion to be contacted or pressed against the optically variable device may comprise a transparent or translucent window in the document, such that any change in the visible appearance of the device can be observed through the window.

Certain exemplary embodiments will now be described with reference to the accompanying figures. For simplicity, selected embodiments will be described in terms of a relaxed state absent an external influence, and a compressed state in the presence of an external influence. However, no embodiment is limited in this regard and any a transition between relaxed and compressed states may be achievable by altering the degree of external influence being applied to the device (rather than completely applying or completely removing the external influence). Further, the examples will be described principally with reference to optically variable devices. However, any such devices may alternatively (or additionally) exhibit changes in the physical properties, texture or feel of the device. It should also be noted that the accompanying figures illustrate exemplary embodiments in a schematic fashion: the thickness of the layers shown relative to one another, or the relative thicknesses of layers in relaxed or compressed states, are not shown to scale but exaggerated from typical working embodiments to facilitate an understanding of certain aspects of the invention.

It should also be noted that some of the examples shown in select figures are described with reference to a 'magnetic control layer' from which emanates a magnetic field, wherein 'magnetic control elements' undergo an optical or physical change depending upon their distance from the magnetic control layer. Other embodiments are described and illustrated with reference to plasmon or electrets devices. However, each of the embodiments illustrated would also be applicable to other forms of control elements/layers, and their respective response elements/layers.

Turning first to FIG. 1 there is shown in FIG. 1*a* a top-plan view of a document shown generally at 9 comprising a core substrate 10. In FIG. 1*b* there is shown a cross-section through the same document along lines A-A' in FIG. 1*a*, with an optically variable device 11 in direct contact with the core substrate 10 of the document.

In FIG. 1 the core substrate 10 may comprise any suitable material or combination of materials, but in this example comprises a polymer such as PET having a thickness of about 12 μm. Attached to the PET is an optically variable device shown generally at 11, comprising three distinct layers. A control layer 12 is in direct contact with the core substrate 10, and comprises any material or structure with an ability to impose an influence upon one or more other layers of the optically variable device (depending upon proximity as described below). In the example shown in FIG. 1 the control layer comprises a vacuum-deposited layer of a metallic material with magnetic properties, and having a thickness of about 200 nm.

In contact with the control layer 12 is a deformable spacer layer 13, which in this instance generally covers the control layer 12. In the embodiment shown in FIG. 1, also present is an optically responsive layer 14 adhered to the deformable spacer layer, wherein the optically responsive layer comprises any material or structure that can undergo an optical change according to its relative proximity (distance) from the control layer. For example, the optically responsive layer may comprise one or more responsive optical elements (not shown) which themselves individually undergo an optical change. The embodiment illustrated in FIG. 1*b* shows how the optically responsive layer 14 is spaced from the control layer 12 by deformable spacer layer 13.

FIG. 1*b* illustrates the device 11 upon substrate 10 in a relaxed state absent any mechanical force upon the device. In the relaxed state the thickness of the deformable spacer layer 13 as shown in the embodiment is about 400 nm: a thickness sufficient to distance the optically responsive layer from the control layer such that any magnetic field emanating from the control layer is insufficient (i.e. insufficient magnetic flux density) to influence the appearance of the optically responsive layer, thus giving rise to a certain optical appearance of the optically responsive layer 14 shown by arrow 15 schematically illustrating reflected light from the optically responsive layer 14, derived from incident light shown with a large arrow.

In contrast, FIG. 1*c* illustrates the same device 11 upon the same substrate 10, but with a mechanical force denoted by arrows 16 applied to the device to cause the deformable spacer layer to be deformed from the relaxed state, thereby to adopt a compressed state. In the compressed state the thickness of the deformable spacer layer 13 is less (e.g. 250 nm) than in the relaxed state shown in FIG. 1*b*. The compression is sufficient to bring the optically responsive layer 14 into closer proximity to the control layer 12, such that a magnetic field emanating from the control layer impinges upon the optically responsive layer sufficiently (e.g. with increased magnetic flux density) to cause the optically responsive layer to adopt an alternative optical appearance, as illustrated schematically by dashed arrow 17 showing an alternative reflected light from the optically responsive layer 14.

Figure 2:
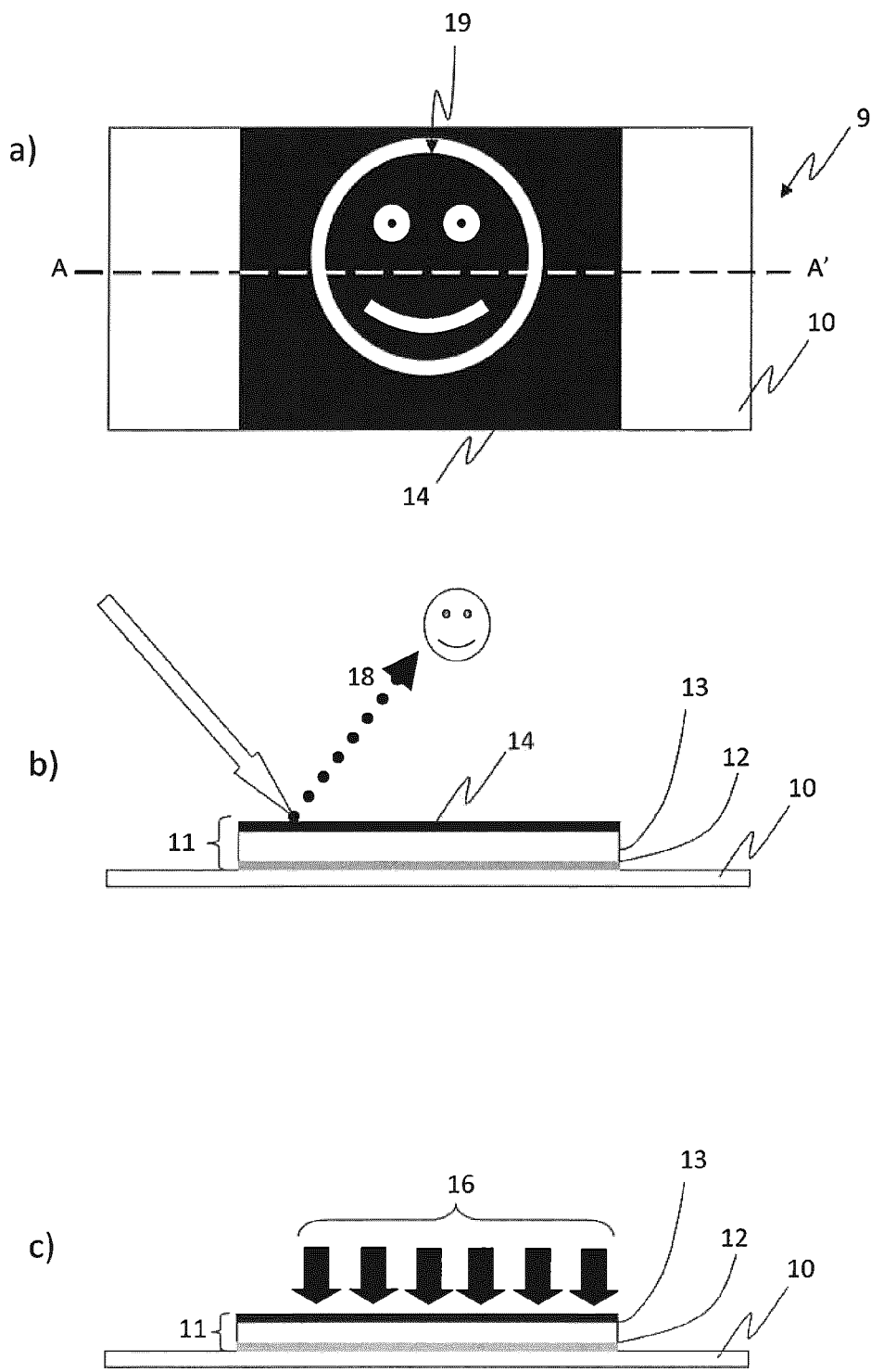

FIG. 2 illustrates an alternative embodiment similar to FIG. 1, but in which discernible optical features are only apparent upon the device when the device adopts a relaxed state absent mechanical pressure. Specifically, FIGS. 2*a* and 2*b* illustrate a device similar in appearance to that shown in FIGS. 1*a* and 1*b*, except that in a relaxed state absent any mechanical pressure incident light upon the device is reflected 18 so that image 19 (see FIG. 2*a*) can be seen on the device by virtue of the optical properties of the optically responsive layer. For example, the optically responsive layer 14 may include ink or toner compositions in the form of magnetic particles in liquid that, depending upon the strength of a magnetic field impinging thereupon from the control layer 12, are able to form image 19. In FIGS. 2*a* and 2*b*, absent mechanical pressure upon the device, the spacer layer is thick enough (e.g. 600 nm) to prevent the magnetic field emanating from control layer 12 from influencing the appearance of optically responsive layer 14.

However, as shown in FIG. 2*c*, application of mechanical pressure denoted by arrows 16 causes deformation of the deformable spacer layer 13 such that it is compressed to adopt a thickness of 400 nm in a compressed state. In this way, the control layer 12 and the optically responsive layer 14 may be brought into closer proximity with one another, such that the magnetic field emanating from the control layer has a stronger influence upon the optically responsive layer, which in turn causes image 19 to change or disappear from view according to the configuration of the device.

Figure 3:
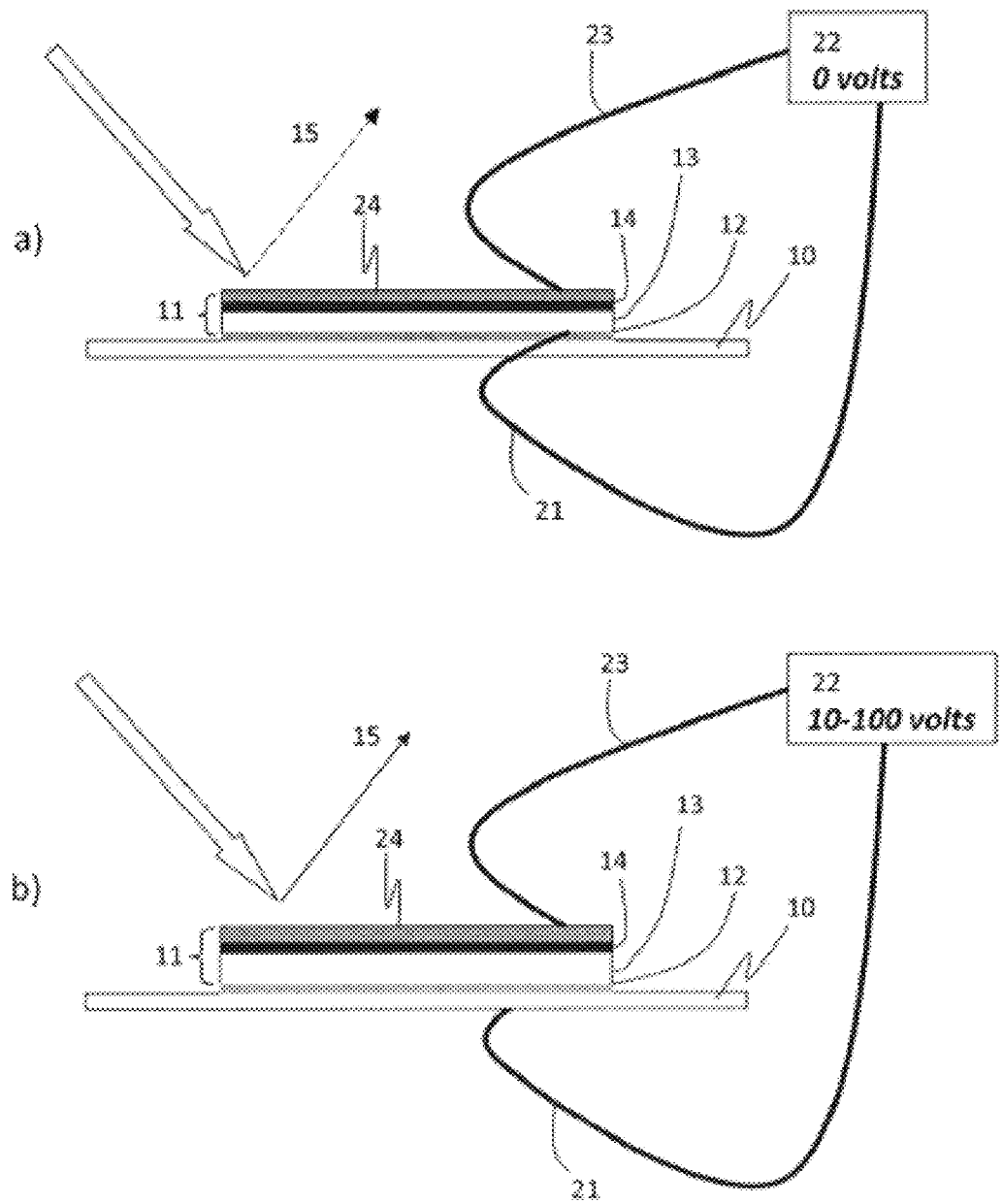
FIG. 3a illustrates a cross-sectional view of a document incorporating an example optically variable device associated with a device for checking a legitimacy of the document.
FIG. 3b illustrates a cross-sectional view of the same document and an optically variable device associated with a device for checking a legitimacy of the document as FIG. 3a, except that a potential difference is applied across the optically variable device.

Whilst the embodiments illustrated in FIGS. 1 and 2 include spacer layers comprising a deformable material, any suitable materials may be used for the spacer layers providing the spacer layer can be caused to undergo a change of thickness in response to some form of external influence. For example, with reference to FIGS. 1 and 2, spacer layer 13 may alternatively comprise a piezoelectric material that can undergo a change of thickness when a potential difference is placed and/or removed from across the device (or an increased or decreased potential difference is present). FIG. 3 illustrates one such embodiment.

In FIG. 3*a* there is shown a core material of a security document 10 in contact with a security device or optical interference structure 11 as herein described and illustrated in previous figures, but including a piezoelectric material rather than a material that is deformable by mechanical pressure. As shown, wire 21 connects power supply 22 to control layer 12 comprising a magnetic material, such that control layer 12 effectively functions as a bottom electrode. Furthermore, wire 23 connects power supply 22 to a top electrode 24, itself in contact (both physical and electrical contact) with optically responsive layer 14. In this way, top electrode 24 effectively acts in concert with optically responsive layer 14 to provide a top electrode component. The top electrode 24 may comprise any material, and be applied by any means. For example, transparent top electrodes may be applied by sputtering over the top of a metallic optically responsive layer, and may comprise materials such as but not limited to a polyethylene dioxythiophene (PEDOT) dispersion sold by HC Stark under the trade name Baytron P™.

In FIG. 3*a* the power supply is shown to provide 0 volts of electrical potential difference. FIG. 3*b*, in contrast, illustrates the same arrangement as FIG. 3*a* except that power supply 22 now provides an electrical potential difference of from 10-100 volts. This in turn causes piezoelectric layer 13 to shift from a 'compressed' state to a 'relaxed' state, and thus adopt an increased thickness of 400 nm: sufficient to induce a change in the optical appearance of the optically responsive layer 14, due to its greater spatial separation from control layer 12. Removal of the electrical potential difference from power supply 22 would cause the device to revert to the 'compressed' state shown in FIG. 3*a*. Thus, application of an electrical potential difference in this embodiment causes an increase in thickness of piezoelectric spacer layer 13. Other embodiments are not limited in this regard: different piezoelectric spacer layers may be configured to achieve alternative changes of state: e.g. compressed to relaxed and back, or decreased thickness, in response to an increased potential difference.

Figure 4:
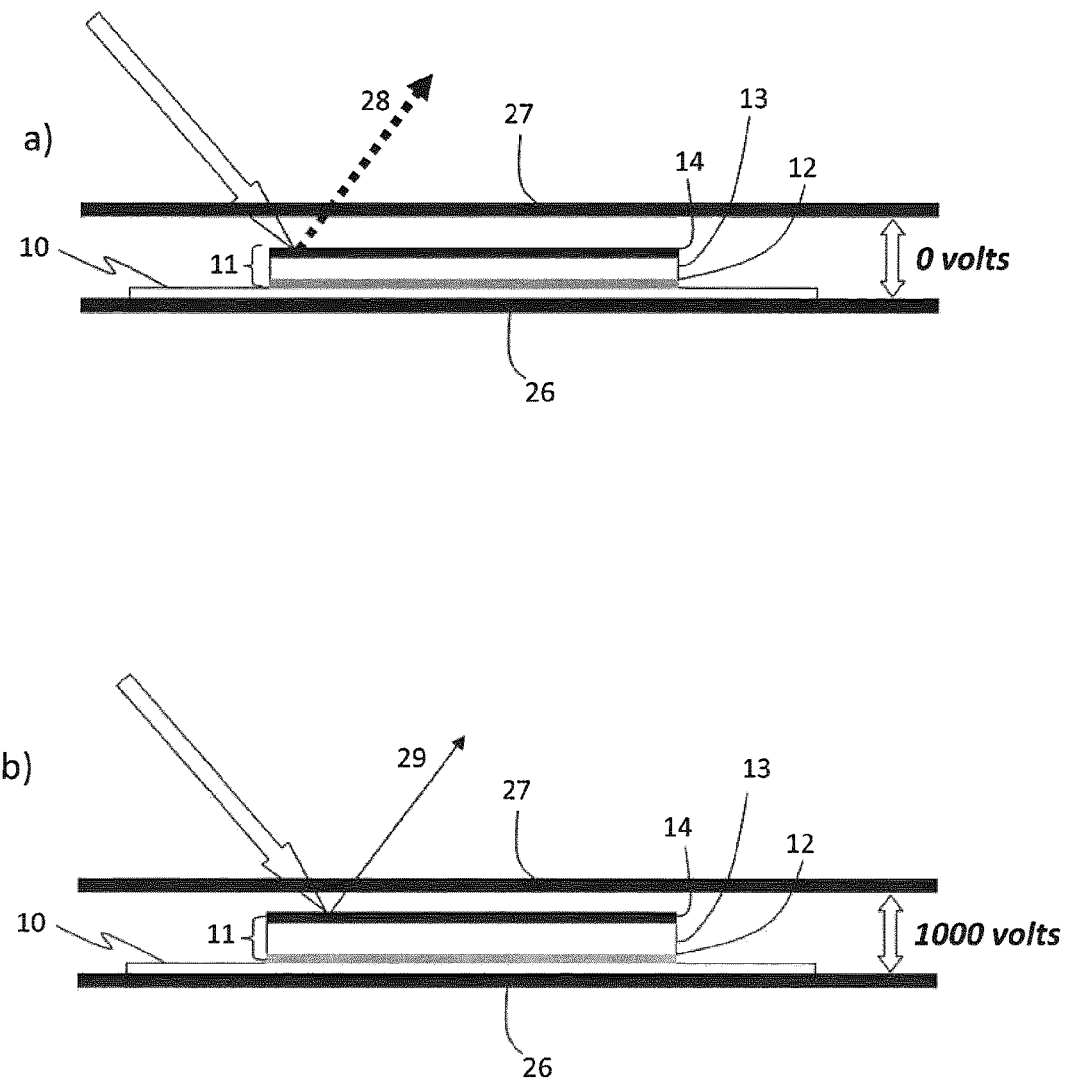
FIG. 4a illustrates a cross-sectional view of a document incorporating an example optically variable device associated with a device for checking a legitimacy of the document.
FIG. 4b illustrates a cross-sectional view of the same document and an optically variable device associated with a device for checking a legitimacy of the document as in FIG. 4a, except that a potential difference is applied across the optically variable device.

FIG. 4 illustrates the same arrangement as FIG. 3, except that the wires 21 and 23 (and electrode 24) are absent, replaced by an electrode-free design in which the electric field generated by an electrical potential difference in itself sufficient to cause the piezoelectric spacer layer to transition between a compressed and relaxed state. In FIG. 4*a* there is shown a core material of a security document 10 together with optically variable device 11. Whilst the core material 10 rests upon bottom plate 26 it insulates control layer 12 from direct electrical contact with the bottom plate 26. Top plate 27 is spaced (e.g. by air) from optically responsive layer 14. In the absence of an electrical potential different the piezoelectric spacer layer 13 remains in a compressed state. However, as shown in FIG. 4*b* application of a higher electrical potential difference of 1000 volts across electrodes 26 and 27 causes the piezoelectric layer to transition from a relaxed state to a relaxed state by virtue of the external electrical field generated. This in turn results in the generation of sufficient electrical potential across the piezoelectric layer for the transition to occur from the compressed to the relaxed state, such that the piezoelectric layer adopts a thickness of 400 nm: sufficiently thick to result a change of optical properties of the optically responsive layer 14, as denoted by arrows 28, 29 schematically showing reflected light from the optically responsive layer 14.

The embodiment illustrated in FIG. 4 may present a useful practical embodiment of the invention, since the electrodes 26 and 27 may form part of a device for checking the legitimacy of, for example, bank notes. A person wishing to verify the legitimacy of a bank note may simply slide or guide the note by hand into the device between two concealed plates, and observe an optical change in the associated security device without need to connect electrodes to the bank note. Thus, the procedure for checking the bank note may be as simple as current procedures involving a UV lamp. Further, if the optical change is visible for example only in beyond-visible light (e.g. UV) then a corresponding lamp may also be incorporated into the bank note verification device.

Figure 5:
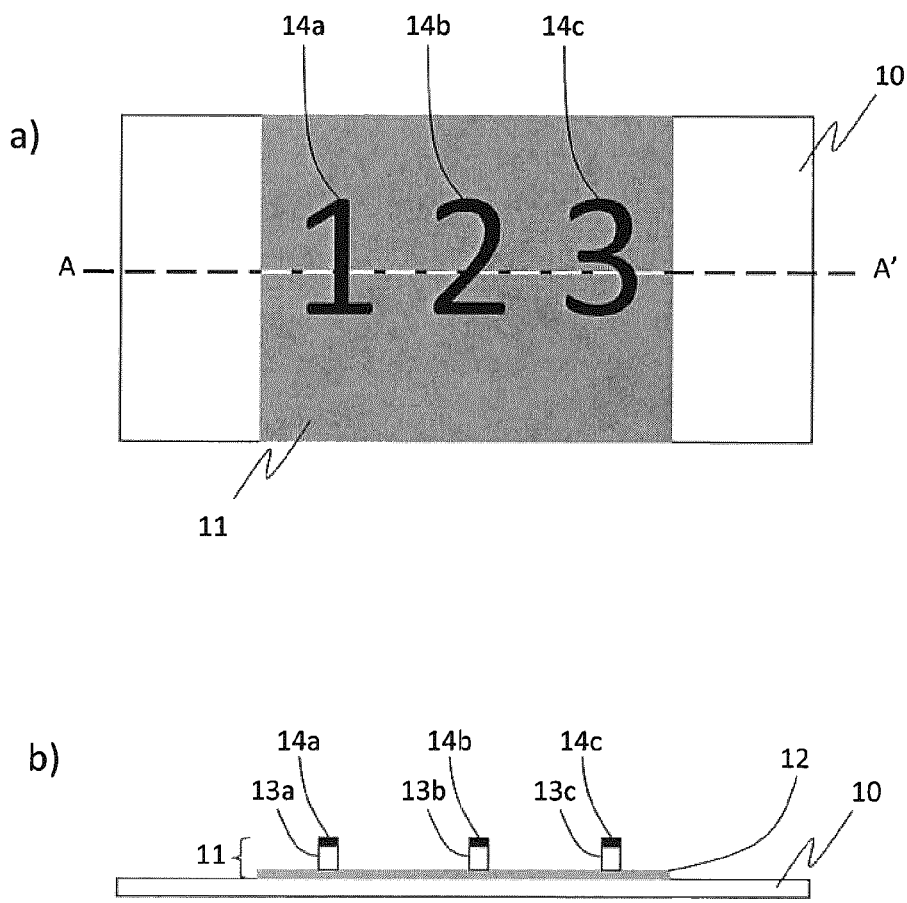
Figure 6:
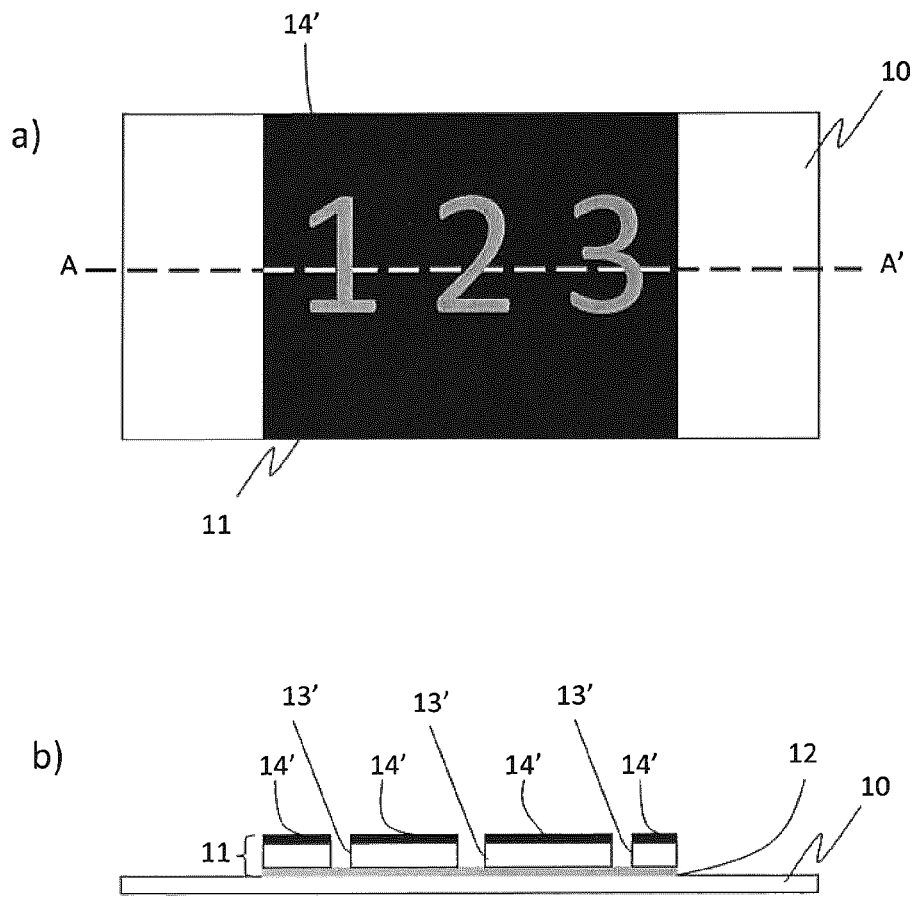
Figure 7:
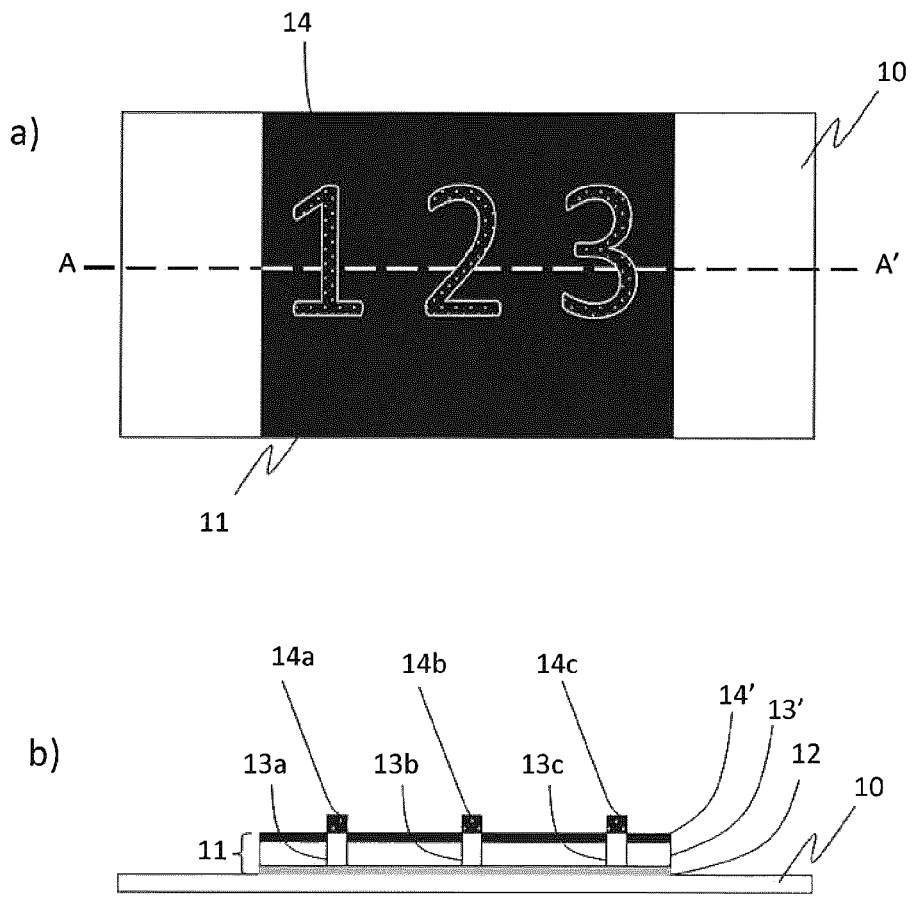

FIGS. 5 to 7 illustrate how content may be included in selected optically variable devices disclosed herein. The embodiments will be described to include a deformable spacer layer, although it will be apparent from the above that any type of spacer layer may be used in substitution of a deformable spacer layer, including piezoelectric or other layers that can change in thickness in response to an external influence. Importantly, FIGS. 5 to 7 do not provide an exhaustive review of means or configurations to include content in the optically variable devices disclosed herein, as will become apparent from other figures.

In FIG. 5 there is shown an authentication device 11 again comprising layers 12, 13, and 14 as for FIGS. 1 to 4, except that the triple-layer structure has only been completed in certain areas by deformable spacer layer 13a, 13b, 13c and optically responsive layer 14a, 14b, 14c. In contrast, FIG. 6 provides in effect a negative of the embodiment illustrated in FIG. 5, with deformable spacer layer 13' and absorber layer 14'. In selected embodiments, such patterns may be achieved by the use of a spacer layer material that is amenable to being printed upon control layer 12 such as by Gravure printing, or alternatively other techniques known in the art may be employed to produce patterns, such as but not limited to vacuum deposition and wet etching techniques. If the spacer layer is adhesive or tacky, then the layer may be contacted with material suitable to form the optically responsive layer, for example located via a release layer on a web, such that the material adheres to the spacer layer and is released from the web, thus to complete the laminate structure of the device. Regardless, the spacer layer may have any properties and thickness as required to achieve as desired loss, gain or change of optical properties as the device transitions between a relaxed and compressed state, as described with reference to FIGS. 1 to 3.

FIG. 7 illustrates an alternative optically responsive device shown generally at 11 including content in the form of numbers 1, 2 and 3 as shown in FIG. 7a. FIG. 7b illustrates a cross-section through the device along line A-A' in FIG. 7a. The portions of the device that include numbers 1, 2, and 3 comprise a deformable spacer layer 13a, 13b, 13c, which is thicker than the deformable spacer layer 13' of the remainder of the device. As a result, whether in a relaxed or compressed state, the numbers 1, 2 and 3 are visible by virtue of the alternative optical properties of the device provided by the differences in the thickness of the spacer layer 13a, 13b, 13c relative to layer 13'. For example, in a relaxed state the portion of the device comprising areas other than those forming number 1, 2, and 3 may comprise a spacer layer 13' having a thickness of 400 nm: sufficiently thin to cause the control layer 12 to impose an influence upon the optical appearance of optically responsive layer 14'. In contrast, in the relaxed state the portions comprising number 1, 2, and 3 may have a spacer layer with a thickness of 650 nm: sufficiently thick to prevent the control layer 12 from influencing the optical appearance of optically responsive layer 14a, 14b, 14c. Upon application of mechanical pressure (or some other suitable external influence), all spacer layers present may be reduced in thickness by 250 nm. This would result in those areas of the device excluding numbers 1, 2, and 3 to adopt a spacer layer having a thickness of 150 nm: sufficiently thin to provide some form of enhanced level of interaction between the control layer 12 and optically responsive layer 14', whereas the spacer layer of the numbers 1, 2, and 3 may be reduced to 400 nm: suitable to provide at least some interaction between respective portions of control layer 12, and optically responsive layer 14a, 14b, 14c. Thus, in such embodiments, the number 1, 2 and 3 may be caused to "disappear" from view, or alternatively adopt an alternative appearance whilst remaining visible to a user in both relaxed and compressed states. Any variants to alter the optical properties of the various regions of the device in the relaxed and/or compressed state are encompassed by the invention.

In other embodiments only selected portions of the device may include a deformable spacer layer (or some other spacer layer that can change its thickness), whereas other portions may comprise any 'regular' spacer layer that cannot change in thickness in response to an external influence. In such embodiments, the portions that include a regular spacer layer and the portions that include a deformable spacer layer may optionally have spacer layers having the same or near identical thicknesses either when the portions comprising a deformable spacer layer adopt a relaxed or compressed state. In this way the content may only become visible to a user upon application or removal of mechanical pressure (or other external influence), to transition select portions of the device to an alternative state (relaxed or compressed) suitable to provide a difference in the relative spacer layer thicknesses of the regions comprising the deformable spacer layer compared to the regions comprising the regular non-deformable spacer layer. For example with reference to FIG. 7a, the device may comprise numbers 1, 2 and 3 each having a regular non-deformable spacer layer, surrounded by other regions having a deformable spacer layer with the same thickness as the regular non-deformable spacer layer only when in one of the relaxed or compressed states. For example, application of mechanical pressure to the device may alter the thickness only of the deformable spacer layer present in the regions surrounding numbers 1, 2 and 3 with a resulting optical difference (gain, loss or change in optical properties) compared to the regions comprising numbers 1, 2 and 3. If the mechanical pressure causes the regions surrounding numbers 1, 2 and 3 to adopt optical properties more different to those of the numbers then this may result in the numbers 1, 2 and 3 becoming more obvious so that they 'appear' to a user upon visual inspection of the device when pressure is applied. In alternative embodiments, the numbers 1, 2 and 3 may be visible to a user only when the regions surrounding the numbers are in a relaxed state, due to a different thickness of the deformable spacer layer in the regions surrounding the numbers compared to the regions comprising the numbers, wherein the numbers may be caused to 'disappear' when a user applies pressure to the device to bring the regions comprising the deformable spacer layer into a compressed state, such that the thickness of the deformable spacer layer is then comparable to the thickness of the regular non-deformable spacer layer. Of course, it will be appreciated that further variants of such embodiments may be used, including use of a deformable spacer layer in the regions of the device forming the numbers, with a regular non-deformable spacer layer in the other regions of the device.

Different thicknesses of the deformable spacer layer may be produced for example by a single Gravure printing step using a template with varying thicknesses of spacer layer material, or by multiple rounds of Gravure printing of the spacer layer material. The embodiments encompassed herein are not limited in this regard, and any means to generate any form of optically variable device, with any type of content, is included within the scope of the invention, the device or structure including, at least in selected embodiments, at least portion comprising a spacer layer giving rise to a change in optical properties upon application of, or increase in, or decrease in, and external influence applied to the device.

Any of the optically variable devices disclosed herein may comprise a deformable spacer layer that can be permanently or temporarily altered (in terms of its thickness) to produce an observable change in the optical properties of the device. Preferably, the change can be repeated on several, or many occasions by virtue of the capacity of the deformable layer material to be repeatedly transitioned or cycled between relaxed and compressed states. Most materials suitable for this application may be compressed relatively quickly so the optical change can be observed without delay. However, consideration must also be given to the relaxation time for the layer; that being the time it takes for the layer to transition back to the relaxed state from the compressed state after removal of the external influence. The invention encompasses the use of any deformable material for any suitable layer giving rise to any relaxation time, although a relaxation time of from 0.001 to 120 seconds would be desired, with a degree of relaxation close to 100% compared to a previous relaxed state. This would allow a user or scanning tool to "check" for an optical change in a device, or repeatedly cycle an optically variable device, without having to wait very long before another check can be made. The deformability of the layer, and the degree of external influence required to cause deformation and transition from a relaxed to a compressed state, may be adjusted according to the materials used. Furthermore, a deformable spacer layer may optionally include a plurality of pores or voids that reduce in volume when the external influence is applied to the device thereby to assist compression of the spacer layer from a relaxed state to a compressed state.

Further embodiments of the optically variable devices encompass 2-layer devices in which the optically responsive layer itself can undergo a change of thickness in response to an external influence. In such embodiments, the need for a spacer layer that can be deformed or otherwise caused to change in thickness is effectively reduced or eliminated. The relative simplicity of 2-layer devices thus presents an advantage for some applications.

An example 2-layer device is illustrated with reference to FIG. 8. For the sake of illustration, the optically variable device 11 is shown independent of any substrate: the device 11 may for example be intended as a separate display item without need for application to a particular object or material. With reference first to FIG. 8a, which provides a cross-sectional view, the device 11 includes control layer 20, which comprises an electret or piezoelectric material suitable to generate an electric field. Affixed to control layer 20 is optically variable layer 21. Optically variable layer 21 comprises a deformable but otherwise non-flowable material 22, into which are embedded optically variable elements, which in the example illustrates are in the form of liquid filled compartments 23 (shown as being spherical in FIG. 9, but which may comprise any shape or form). Each compartment 23 comprises a liquid suspension of electrostatic particles 24 (a collection of particles is shown schematically as 24 in each compartment 23; individual nanoparticles are not shown in FIG. 8 as they may be micro or nanoparticles). In FIG. 8a the electrostatic particles are substantially located on the control layer-side of the compartments 23—for example the electrostatic particles 23 may be located in this position due to the effects of gravity or thermal agitation.

FIG. 9b illustrates the same device as FIG. 9a in cross-section, but in contrast to FIG. 9a a mechanical force is applied illustrated schematically by arrows 25. The effect of the mechanical force deforms or otherwise squashes the optically responsive layer 21 (comprised mainly of deformable material 22), so that compartments 23 are pressed into a closer proximity with electrostatic control layer 20. Thus, electrostatic particles 23, by virtue of their closer proximity, are influenced by the electric field emanating from control layer 20, and are repelled such that they migrate to a side of the compartments 23 opposite the side facing the control layer as shown: the force of repulsion by the field being greater than the force of gravity or thermal agitation acting upon the particles. The migration of the electrostatic particles in turn provides a change in the optical appearance of the device 11, at least when observed from 'above' the device (i.e. when viewing a side opposite the control layer 20).

Figure 8:
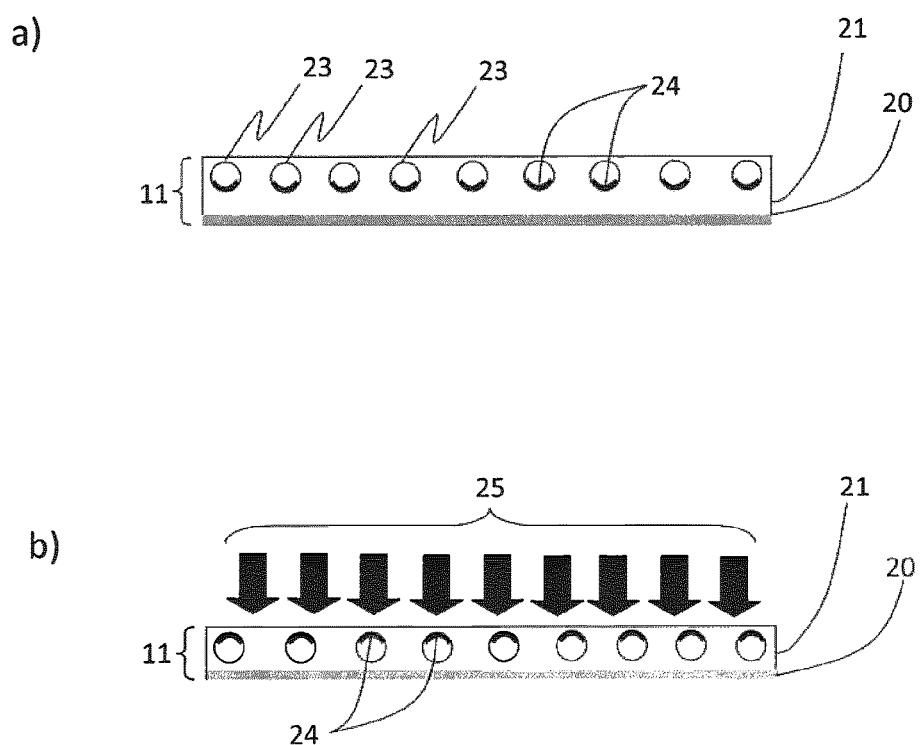
FIG. 8a illustrates a cross-sectional view of an example optically variable device.
FIG. 8b illustrates a cross-sectional view of the example optically variable device shown in FIG. 8a under mechanical pressure.

Thus, FIG. 8 illustrates one embodiment in which two layers are sufficient to provide a device in accordance with select embodiments of the invention. Of course, further embodiments may involve two-layer devices that utilize magnetic fields or plasmon resonance characteristics of materials to provide the desired visual effect. Alternatively, a visual change may be induced by rotation of particles in fluid as an alternative to particle migration.

Figure 9:
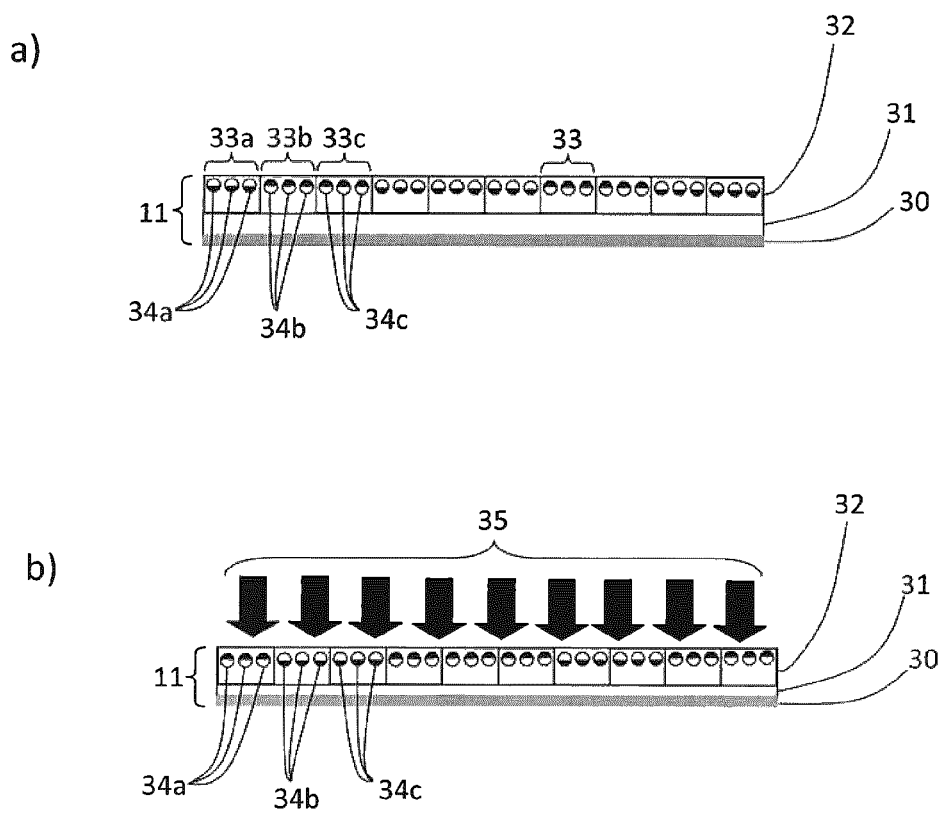
FIG. 9a illustrates a cross-sectional view of an example optically variable device.
FIG. 9b illustrates a cross-sectional view of the example optically variable device shown in FIG. 9a under mechanical pressure.

FIG. 9 schematically illustrates an alternative 3-layer embodiment in which the optically responsive layer includes compartments with particles that react in alternative ways. In FIG. 9a there is shown a device 11 comprising a control layer 30, which for the sake of this example comprises a metallic layer generating a magnetic field. Immediately juxtaposed to the control layer 30 is deformable spacer layer 31. Immediately juxtaposed to deformable spacer layer 31 is optically responsive layer 32 comprised of a plurality of adjacent fluid-filled compartments 33. Each of the fluid-filled compartments 33 includes in suspension bi-coloured, polarized magnetic particles 34. In FIG. 9a the particles 34 are shown under the influence of gravity such that particles 34a in compartment 33a are oriented with their darker side facing towards control layer 30, whereas particles 34b, 34c in compartments 33b, 33c are oriented in an opposite manner with their lighter side facing control layer 30.

FIG. 9b illustrates the same optically responsive device to that shown in FIG. 9a under an external influence of mechanical pressure. In FIG. 9b mechanical pressure is applied to the device as illustrated schematically by arrows 35. The effect of the mechanical pressure 35 is to force deformable spacer layer 31 to adopt a squashed or deformed configuration such that it is thinner than in FIG. 9a. As a result, optically responsive layer 32 is brought into closer proximity with control layer 30, and as a result particles 34 are brought sufficiently close to control layer 30 that they are more influenced by the increased magnetic flux density of the magnetic field emanating from magnetic control layer 30, causing the particles effectively to reverse their orientation compared to FIG. 9a. Under the influence of the magnetic field, particles 34a in compartment 33a orientate themselves such that their lighter side faces the control layer 30, whereas particles 34b, 34c in compartments 33b, 33c orientate themselves such that their darker sides now face away from the control layer 30. It follows that an observer or user of the device will observe a change in the appearance of the compartments when mechanical pressure is applied to the device. If the compartments are arranged in the form of pixels, then one image may be apparent to a user absent mechanical pressure, but an alternative image (or a negative of the initial image) may be apparent when mechanical pressure is applied to the device. Whilst this embodiment has been described and illustrated with reference to magnetic forces and magnetic particles, any other control layer and responsive optical elements (or optically responsive layer) may be used, including for example the use of electrostatics or plasmon resonance. In further related embodiments, the spacer layer may be eliminated or absent to provide a 2-layer device, and layer 32 comprised of a deformable material such that its deformation has a similar effect to bring particles 34 sufficiently close to control later 30 to induce movement.

It is important to note that content may optionally be incorporated into any of the embodiments herein described by the use of non-uniform layers, wherein a non-uniform layer includes varied material types and constituents across the layer. For example, some devices may comprise a control layer in which only a portion of the control layer includes material that generates a magnetic field, an electric field, or that has a surface plasmon resonance suitable to influence an optically responsive layer. Likewise, in addition to or instead of the content in the control layer, the optically responsive layer may itself be non-uniform such that only portions of the layer are able to "respond" to the proximity of the control layer. For example, only portions of the optically responsive layer may include responsive optical elements, or may include various amounts, densities of the responsive optical elements compared to other portions of the layer. Alternatively, different portions of the optically responsive layer may comprise different types of responsive optical elements, including for example those that give rise to different colour or reflectance changes. Thus, changes in the optical appearance of an optically variable device as described herein may be localized to specific regions of the device, or alternative optical changes may be generated in different regions of the device. As discussed elsewhere, a spacer layer, if present, may additionally or alternatively be non-uniform in terms of its constituents and/or thickness to add further content to the device.

The embodiments disclosed herein may further include optically variable devices that undergo different changes in appearance according to a degree or level of external influence being applied to the device. In just one example, significant mechanical pressure may be applied to an optically variable device, such that the deformable layer or layers of the device 'relax' over a period of time, perhaps 1 second to 20 minutes in length. The optical appearance of the device may depend upon the degree of relaxation of the deformable layers, such that the optical properties of the optically responsive layer change as the deformable layers are, for example, 20% relaxed, 40% relaxed, 60% relaxed, 80% relaxed and 100% relaxed. Thus, as the deformable layer or layers continue to relax from a compressed to a fully-relaxed state, a progressive change in the appearance of the device may be observed. Such embodiments clearly present the option for select devices to present changing or even moving images, depending upon a number of stages of relaxation, and a speed of relaxation, of the device.

Further exemplary embodiments encompass a use of any optically variable device as herein described, as a feature of an item, document or display.

Further exemplary embodiments provide for an item or document comprising:

a core material; and at least one optically variable device as herein described, affixed to at least one side of the core material, or at least partially embedded into the core material, such that the optically variable device is at least partly visible in reflected light from said at least one side. The core material may comprise any material suitable for the production of a document, but in selected embodiments may comprise at least one material selected from the group consisting of: paper, polymer, and plastic, and combinations or hybrids thereof.

The optically variable devices described herein may be incorporated onto or into the core material of the document via any appropriate means, and may take any form or shape suitable for the document or item to which they are applied. For example, the device may take the form of a thread either laminated or adhered into position upon the core material or the document, or woven into the core material in a manner known in the art. The device may be entirely visible on the document, or may be only partially visible through 'windows' formed either by the threading of the device through the core material of the document, or by masking of select portions of the device by way of a masking material.

Optionally, the document may further comprise a portion to be pressed against the optically variable device, thereby to cause a change in the visible appearance of the device. For example, the document may be folded over to align the portion so that it can be pressed against the device, thereby to alter a thickness of at least one of the optically variable layer or the spacer layer (if present) to cause a change in the visible appearance of the device. Optionally, the portion to be pressed against the optically variable device comprises intaglio printing, thereby to provide a raised, optionally patterned, region as a pressure template to achieve the change in visible appearance of the device. In this way, the raised, printed portions may exert increased pressure upon the device compared to adjacent unraised portions, thereby to achieve a desired pattern of mechanical pressure upon the device, and a resulting pattern of optical variation in the device. Alternatively, the portion to be pressed against the optically variable device may comprise simply a transparent or translucent window in the document, such that folding of the document and alignment of the window with the device, followed by mechanical pressure by the window on the device, causes a change in the appearance of the device visible through the window.

Figure 10:
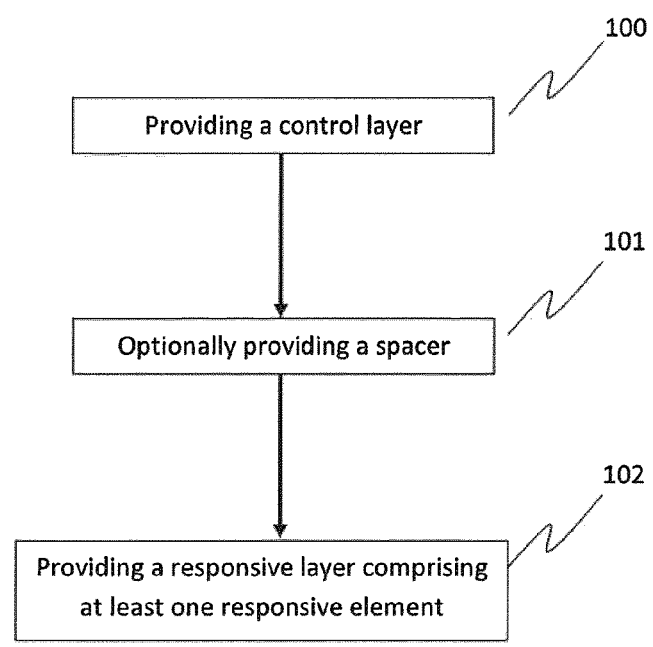
FIG. 10 illustrates a method for producing an example optically variable device as described herein.

Further exemplary embodiments relating to FIG. 10 provide for a method for producing an optically variable device, the method comprising the steps of:

in step 100 providing a control layer;

in step 101 optionally providing a spacer layer upon preselected portions of the control layer, the thickness of which can be altered by an external influence; and in step 102 providing a responsive layer upon preselected portions of control layer or the spacer layer if present, the responsive layer comprising responsive element(s) responsive to their distance from the control layer, so that the optical and/or other physical properties of the responsive layer are dependent upon the thickness of the spacer layer if present, and/or upon the thickness of the responsive layer, as influenced by the external influence;

wherein the steps 100, 101 and 102 may be performed in any order.

Figure 11:
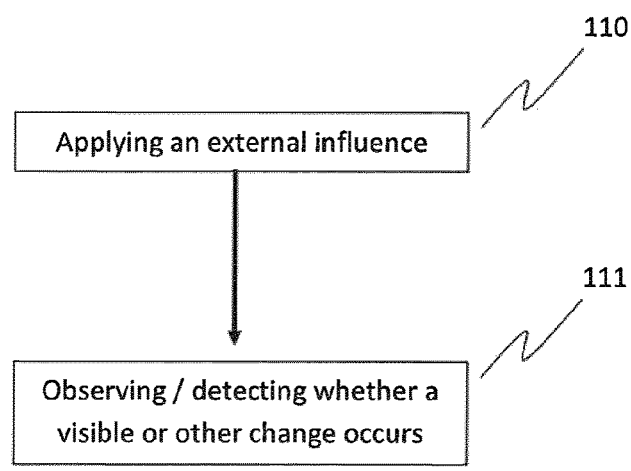
FIG. 11 illustrates a method for checking the legitimacy of a security document incorporating an optically variable device as described herein.

In further embodiments, illustrated with reference to FIG. 11, there are provided methods for checking whether a security document is a legitimate or counterfeit document, the security document comprising at least one device as described herein, visible or touchable on at least one side thereof, the method comprising the steps of:

in step 110 applying an external influence to at least one device; and in step 111 observing or otherwise detecting whether the external influence causes a change in the appearance or physical properties of the device, wherein any change is indicative that the security document is a legitimate document. Optionally, in step 110, the external influence may comprise increased or decreased mechanical pressure upon the device, or application of an increased or decreased potential difference across the device. Optionally, step 111 of checking comprises inspection (visual or physical) of the device upon application and/or removal of the external influence.

Alternatively, step 110 of applying comprises pressing a portion of the security document against the optically variable device. Optionally, the portion of the security document comprises intaglio printing as a pressure template for said mechanical pressure. Optionally, the portion comprises a transparent or translucent window in the document so that a change in the appearance of the device may be observed through the window as said mechanical pressure is being applied.

The following examples provide further illustrate of certain exemplary embodiments, which are in no way intended to be limiting with respect to the scope of the appended claims.

Example 1—Tunable Plasmonic Devices

This example discloses efforts by the inventors to fabricate a flexible pressure sensitive device based on near-field coupling between silver nanoparticles and an underlying conductor. Visually apparent color changes can be realized with minimal change in separation owing to the high fields localized to the particle's surface. The use of soft and compliant materials enables actuation of the device at low strain.

With improvements to the synthesis of nanoparticles and fabrication techniques for nanotechnology, opportunities for plasmonic devices are expanding. Simultaneously, increasing demand for responsive materials has fuelled continued investigation.

Among their potential uses, conductive nanoparticles can be employed as sensitive optical devices, having a response that is highly dependent on their surroundings. Furthermore, their high optical cross-section at resonance imparts significant absorbance for even a sparse monolayer of particles. For these reasons, they have been used as optical sensors[1,2] and as sensitizers for Surface-Enhanced Raman Spectroscopy[3] (SERS) and fluorescence.[4,5] To date, however, the particles have generally been restricted to use in static configurations. Only more recently have efforts turned towards dynamic tuning of the nanoparticle configuration.[6]

By actively controlling the coupling distance, a dynamic optically tunable device has been realized by the inventors. A random distribution of conductive nanoparticles is simultaneously easier to manufacture than ordered structures while maintaining high absorbance. A layered device structure offers design flexibility by disentangling the nanoparticle deposition from the coupling interaction. With suitably designed inks, such an approach could also be attractive for printable devices. Potential applications of interest would include touch responsive materials, pressure sensors, and low complexity reflective displays.

In this example, the simulation and fabrication of a simple device structure having a tunable resonance is disclosed, which relies on the coupling of silver nanoparticles to an underlying metal film. A polydimethysiloxane (PDMS) elastomer substrate was coated with nanoparticles and subsequently suspended over a flexible aluminum coated substrate. A spacer layer has been used to maintain a gap in its unactuated state. With applied pressure, the gap is reduced and the nanoparticles are brought into close proximity with the underlying metal film, resulting in a large shift in the observed optical absorbance.

To better understand the response of a nanoparticle in proximity to a conductive film, it is instructive to first consider the behaviour of isolated particles. Although a wide range of techniques exist for modelling a variety of geometries,[15] we will restrict the discussion here is restricted to spherical particles.

In an approach that is similar to the decomposition of a signal's spectral content by Fourier analysis, a particle's response to incident light can be uniquely expanded into a series of orthogonal modes by Vector Spherical Harmonics.[16] With this technique, scattering by a spherical particle can be expressed as $$E_s = \sum_{n=1}^{\infty} E_n[ia_n N_n(r, \phi, \theta) - b_n M_n(r, \phi, \theta)]$$

where $a_n$ and $b_n$ are scattering coefficients specific to particle geometry, as calculated using Mie theory,[16] and $E_n$ represents the contribution of the incident field to a given multipole mode. An incident plane wave, for instance, can be decomposed into a series of orthogonal multipole field distributions such that $E_n = i^n E_0 (2n+1)/n(n+1)$.

Figure 12:
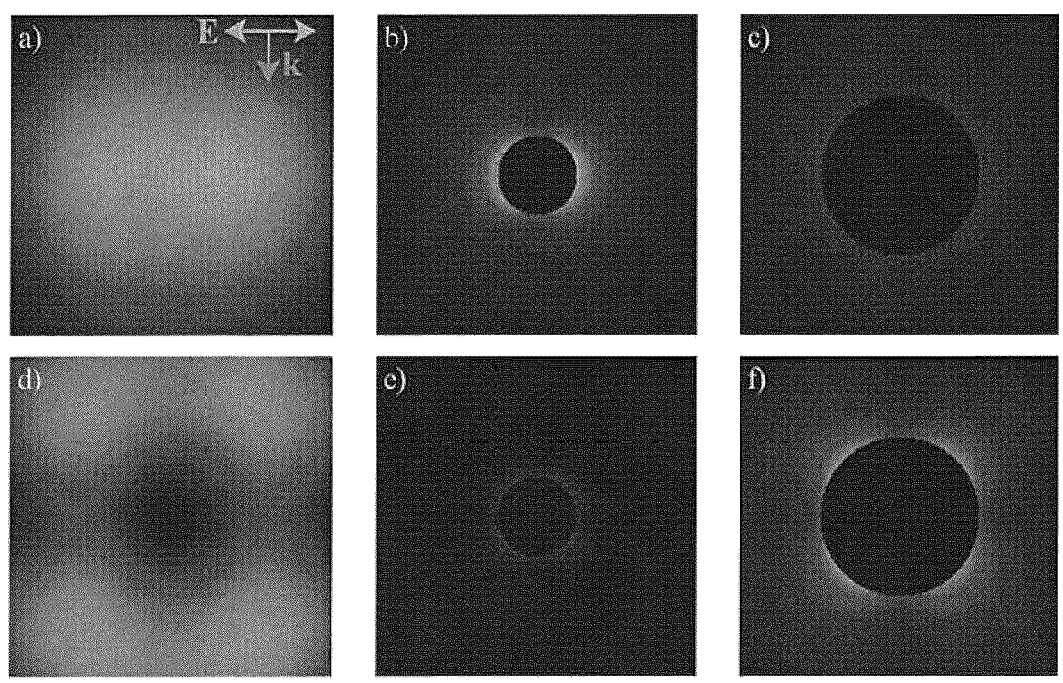
FIG. 12 illustrates a Mie scattering calculation of multipole excitation for silver spheres having radii of 50 nm and 100 nm, excited by 400 nm plane wave propagating along the Z axis and polarized along the X-axis. The scattered field in response to the dipole and quadrupole components is plotted within the XZ plane. a) Dipole mode distribution of incident wave and orientation of incident plane wave b) Dipole scattering by 50 nm sphere c) Dipole scattering by 100 nm sphere d) Quadrupole mode distribution of incident wave e) Quadrupole scattering of 50 nm sphere f) Quadrupole scattering of 100 nm sphere.

FIG. 12 illustrates the near field responses of two individual silver nanospheres due to an incident plane wave with a wavelength of 400 nm. Although the incident wave has significant dipolar and quadrupolar amplitudes, each particle preferentially responds to one mode and has a total effective extinction cross-section of $$C_{ext} = \frac{2\pi}{k^2} \sum_{n=1}^{\infty} \left|\frac{E_n}{E_0}\right|^2 \frac{n^2(n+1)^2}{2n+1} \text{Re}\{a_n + b_n\}$$

Although the scattering coefficients $a_n$ and $b_n$ are fixed for a given particle, total extinction can be controlled by altering the spatial distribution of the incident field. If, for example, the dipolar component in FIG. 12 were to be attenuated, a much smaller extinction cross-section could be anticipated for the 50 nm sphere. By contrast, the total extinction cross-section of this particle is much less sensitive to changes in higher order modes. By selectively enhancing or attenuating specific multipole modes, tuning of the localized surface plasmon resonance peak or excitation of dark plasmon modes are possible. In practice, this can be accomplished by using highly focused light sources[17,18] or by introducing additional surfaces or nanostructures which modulate the local electric field distribution.[19,20]

Figure 13:
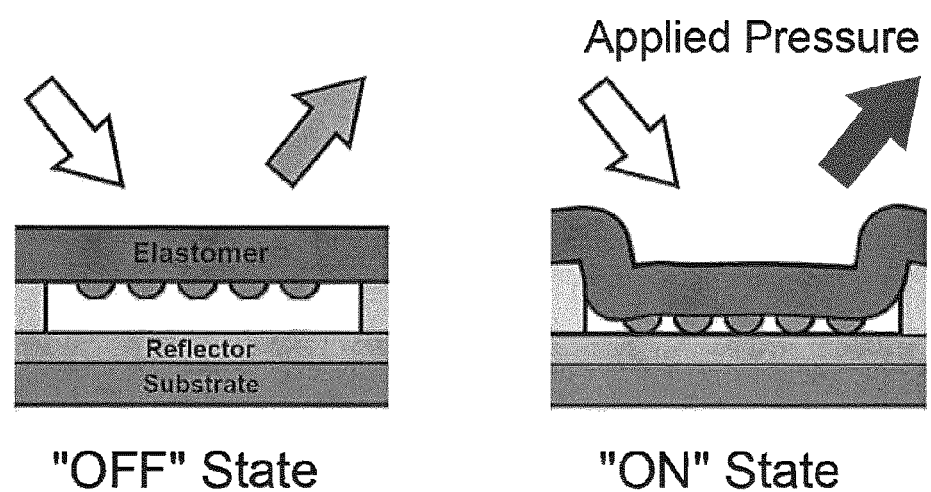
FIG. 13 schematically illustrates an optically variable device structure with deformable nanoparticle film over a conductive metal film. Near-field interaction with image charges results in shift in surface plasmon resonance wavelength.

A tunable optical device, as illustrated in FIG. 13, can be achieved with the addition of a conductive film in close proximity to an array of suspended nanoparticles. Here, the extinction of the structure is influenced by interaction of the particle with incident, reflected, and scattered waves. Where the underlying conductor can be approximated as a perfect electric conductor (PEC), the system can be analytically modelled and understood by replacing the film with an image particle.[14] In this view, the interaction dynamics between the object and image particle are similar to those of aggregated particles.[21,22]

As with isolated particles, changes in resonance for this structure arise due to changes in the local field and originate, primarily, from the particle's near-field being reflected back onto itself. As the distance between the particle and substrate decreases, coupling is rapidly enhanced, owing to the exponential character of the near-field. A second effect, which can be exploited in some circumstances, is due to the standing wave between the incident and reflected plane waves of the source. At the PEC surface, the electric field is reduced to zero due to destructive interference between the two waves. For very small particles, the low field intensity near the surface gives rise to a lower optical response.

These effects have been explored using a commercial finite element analysis tool (COMSOL) for flexibility in the simulation of both spherical and non-spherical particles. The calculated results illustrate reflectance from an array of silver particles in close proximity to a PEC substrate. For the purposes of this example, an incident plane wave propagating normal to the surface was used as the source. Interpolation of tabulated material data[23] was used for modelling silver permittivity.

Figure 14:
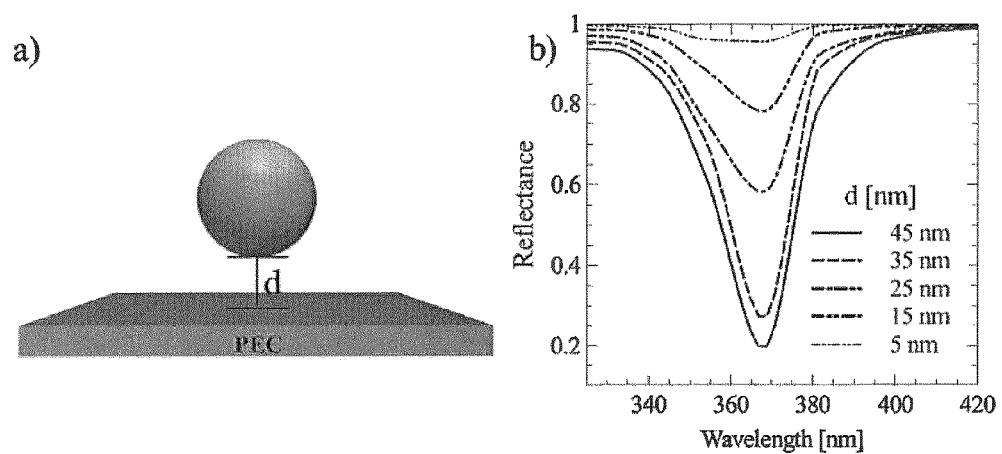
FIG. 14 (a) schematically illustrates a metal nanoparticle suspended over a conductive metal film at distance d (b) illustrates calculated reflectance from an array of 10 nm spherical silver particle in proximity to an underlying conductor at various distances d, with 20% surface coverage.

Commonly exploited for anti-reflection coatings, standing waves occur due to interference between incident and reflected plane waves. For very small particles, such interference effects can be exploited using a deformable structure to modulate the optical density. In an unactuated state, the particles are separated from the substrate and have large optical density at resonance. In response to a stimulus—for instance, electrical or mechanical—a decreasing gap results in decreased optical density due to the reduced field strength experienced by the particles, as shown in FIG. 14. Visual contrast between these two states is possible due to the significant absorbance generated, even by a single layer of nanoparticles. In FIG. 14b, a surface concentration of only 20% imparts significant losses to the reflected signal when particles are separated from the film.

The absence of observed shifts in the resonance peak indicates that, for very small spheres (less than 10 nm), the contribution of near-field coupling is not significant even at 5 nm of separation. Near-field interaction would be observed as separation becomes further reduced. By this point, however, the low field experienced by the particle gives rise to small optical activity in this structure.

For larger or non-spherical particles, the optical absorption of the structure at these distances is dominated by near field interaction between the particle and reflected image field. In contrast to very small spheres, such particles are more responsive to changes in the spatial distribution of the exciting field. Furthermore, owing to the exponential character of the near-field, this behaviour is highly sensitive to changes in distance. The interaction can therefore be nearly extinguished with minimal increase in separation between the structures. In selected embodiments, such sensitivity may be highly desirable for manufacturing a responsive device.

Figure 15:
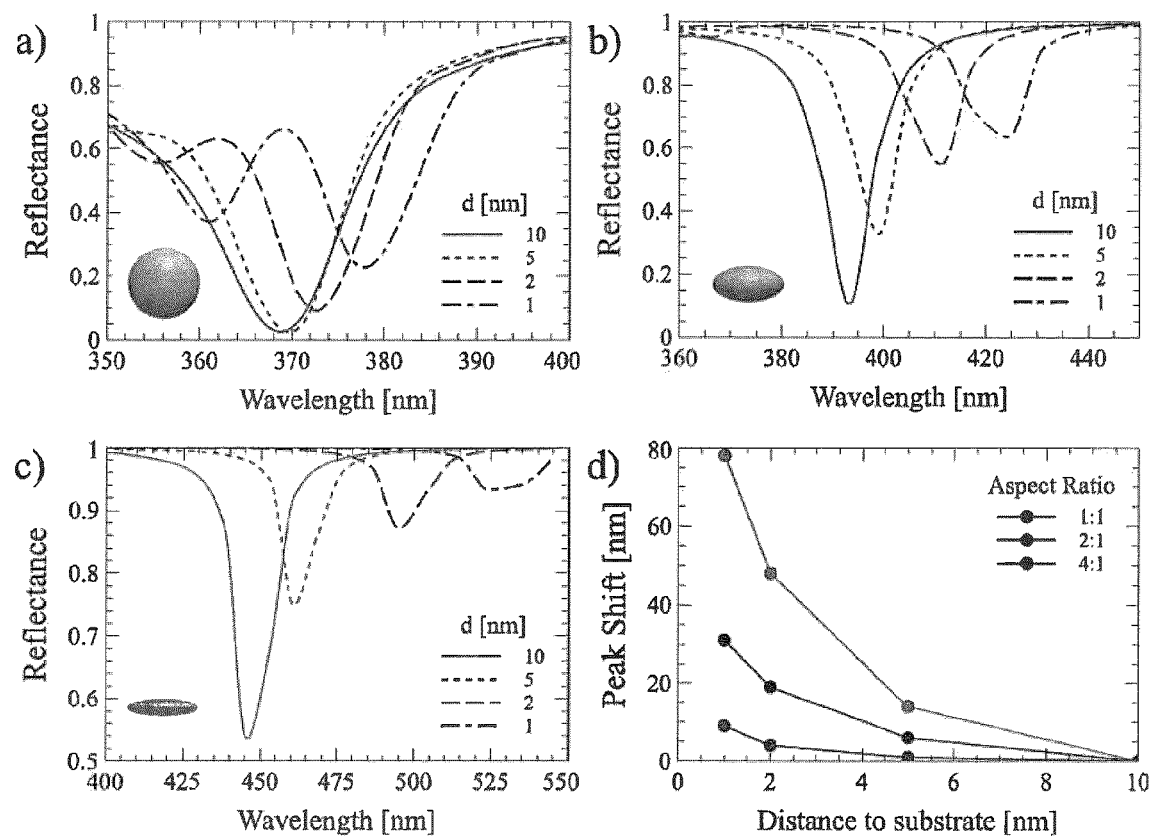
FIG. 15: illustrates reflectance changes due to near field interaction for (a) 40 nm spheres, (b) oblate spheroid (40 nm×20 nm) and (c) oblate spheroid (40 nm×10 nm). Surface concentration of 20% was used in all cases; (d) relationship between primary resonance peak and distance to the underlying substrate.

Illustrated in FIG. 15 are the optical responses for a selection of spheroids in proximity to an underlying metallic film. Of particular note is the enhanced responsiveness of ellipsoidal particles compared to spherical particles. The explanation lies in their differing response to higher order multipole excitation. As distance decreases, the contribution of high order multipoles to the optical response is of increasing influence. Ellipsoids have a much larger response to high-order excitation than do spheres of similar size and can therefore be expected to produce larger shifts.

As an intermediate step towards a responsive device, test structures were constructed by forming silver nanoparticles at well-defined distances from an aluminum reflector. In these samples, spacer layers having variable thicknesses were created using $SiO_2$ films deposited by e-beam evaporation. Film thicknesses were monitored during deposition using a quartz crystal microbalance and confirmed by single beam ellipsometry at 632 nm.

Figure 16:
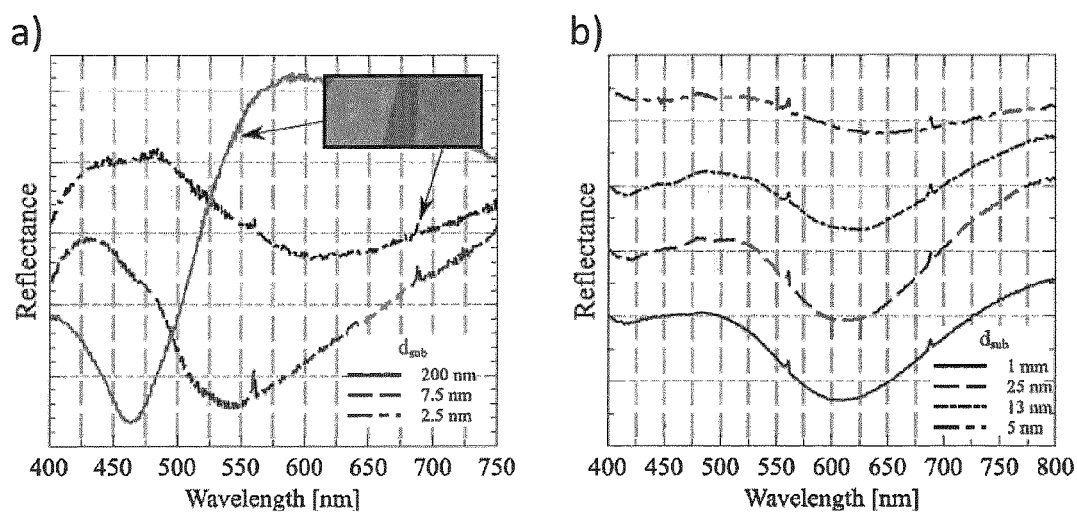
FIG. 16 provides a graph to show reflectance spectra for test device structures having variable distance between nanoparticle film and underlying aluminum reflector: a) hemispherical silver island films (inset) Photograph of the silver island film samples for spacer thicknesses of 200 nm and 2.5 nm b) 40 nm×10 nm nanoplates with data vertically offset to further illustrate resonance shifts.

Near-field induced shifts were studied using two different nanoparticle films. The first, shown in FIG. 16a, are silver island films formed by annealing of e-beam evaporated silver[24,25,26]; the second, in FIG. 16b, are silver nanoplates (0.02 mg/mL silver nanoplate concentration, nanoComposix), applied by self-assembly using an electrostatic linker between the particles and the substrate.[27]

Fabrication of silver island films was achieved by deposition and annealing of a thin 7 nm silver film deposited on the spacer layer. In a nitrogen ambient at elevated temperatures, the film undergoes a dewetting process due to poor adhesion with the spacer oxide. The resulting structure comprises a randomly distributed array of hemispherical islands. These islands feature a resonant absorption, whose peak frequency is dependent on their size and packing density. As demonstrated in FIG. 16a, when in close proximity to an underlying aluminum film, the resonance peak undergoes a significant shift. Although, these island films are simple to manufacture, limited options exist for tuning the detwetting process. A variety of alternatives are available by instead adsorbing synthesized nanoparticles onto the surface.

The self-assembled layer of silver nanoplates was produced by first oxidizing a polydimethylsiloxane (PDMS) surface with an O2 plasma followed by adsorption of polyethylenimine (PEI) (1% in DI water) from solution over a 24 hour period. With the polyelectrolyte layer in place, the sample was immersed for 4 hours into the silver nanoplate suspension. Adhesion of the nanoplates to the surface relied on electrostatic interaction between the positively charged PEI molecules and the negative surface charge of the polyvinylpyrrolidone (PVP)-capped silver particles.

The particle-coated PDMS surface was subsequently placed in contact with the aluminum/SiO 2 test structures for measurement. As illustrated in FIG. 16b, no changes in the reflected signal are observed over distances spanning nearly five orders of magnitude (from 1 mm to 25 nm). Instead, a shift in resonance is observed only when the particles are very close. In addition to the observed shift, there is also a decrease in the optical density of the film. As these particles are very thin—approximately 10 nm in thickness—this phenomenon can be understood by revisiting the calculated results from FIG. 14 for very small particles. When in close proximity to the underlying conductor, the exciting field in the vicinity of these thin plates is very low, resulting in a similarly small absorbance.

A rudimentary flexible structure, outlined in FIG. 17a, was realized by deposition of silver nanoparticles or island films onto a deformable PDMS elastomer. The silver particles were applied to the cured PDMS films either by e-beam & annealing or by self-assembly, as described previously.

Figure 17:
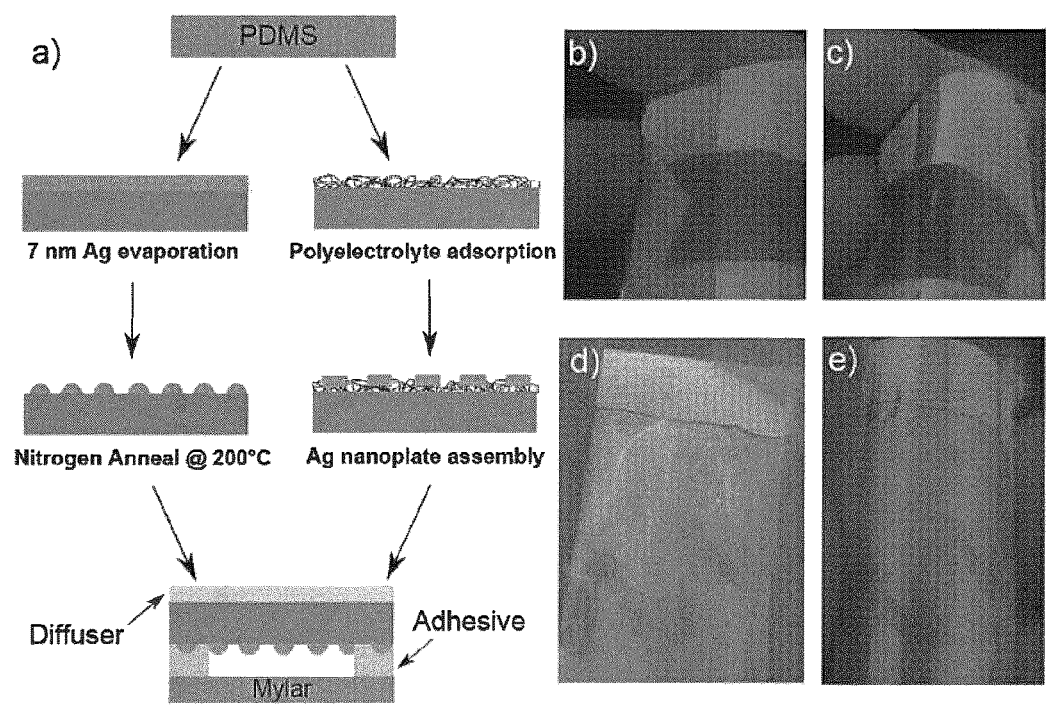
FIG. 17: a) Process overview for a flexible optically variable device structure using: (b)-(c) silver island films and (d)-(e) silver nanoplates. A thin photoresist layer was applied to the region shown in figure (d) and (e) to provide a reference when comparing the two images.

The resulting PDMS/silver assembly was subsequently suspended over a flexible aluminized Mylar substrate. For these tests, a simple adhesive support layer was used to maintain a gap between the two films in their unactuated state. In addition, a diffusing film was incorporated within the stack in order to scatter the otherwise specularly reflected light. As shown in FIG. 17, observable color changes are achieved under applied mechanical strain.

Although silver nanoparticles were used in both cases, the difference in their shape yields unique responses. The synthesis of nanoparticles has greatly matured in recent years and a diverse range of geometries can now be realized. By selecting from a variety of materials and particle geometries, a broad palette of colors and responses would be achievable.

Plasmonic nanostructures are undergoing continual investigation and development. An ever increasing assortment of synthesized particles and improved fabrication techniques has greatly expanded potential applications for such devices.

In this example, a simple and flexible optically variable device and corresponding theoretical considerations were discussed. Actuation of a deformable bridge structure allowed for variation of near-field coupling under the application of pressure. The optical response of conductive nanoparticles is highly sensitive to changes in close proximity, thus only small perturbations of the structure are required to achieve large optical responses. By coupling between layers rather than between precisely aligned particles, simplified deposition techniques can be used to apply the nanoparticle layer over large areas.

Example 2—Embodiments and Studies that Employ Electrets

Figure 18:
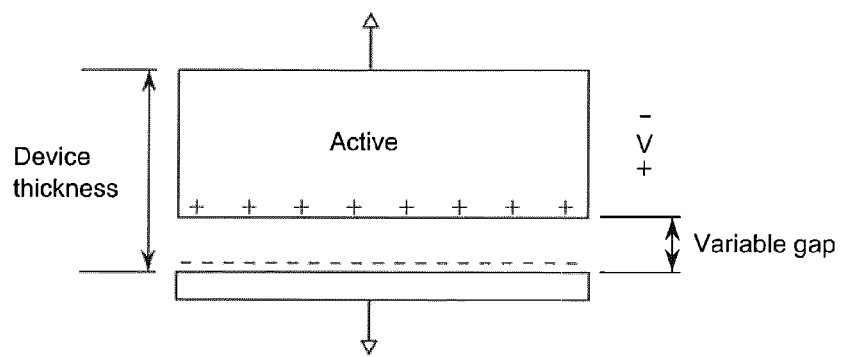
FIG. 18 schematically illustrates an exemplary device (in cross-section) that includes two charged layers.

FIG. 18 schematically illustrates one embodiment in the form of a layered device comprising two charged layers, and a variable gap inbetween. One of the charged layers effectively functions as a control layer, and the other charged layer functions as the optically responsive layer. This forms a device comprising negatively and positively charged electret layers separated by a variable gap. As illustrated the variable gap is absent any material, but in accordance with the present teachings the gap may comprise for example a spacer layer that becomes deformed or squashed when the device is subjected to mechanical pressure. The region of the device labeled as "active" comprises the optically responsive layer, which itself is composed of reversible electro-responsive materials responsive to electric field changes caused by changes in the proximity of the negatively charged control layer. For example, the "active" optically responsive layer may comprise polarisable bichromal janus spheres, or charged electrophoretic materials. A voltage drop across the active layer causes a flip between positive and negative charges present by changing the width or dimensions of the variable gap, for example by at least one micron.

Figure 19:
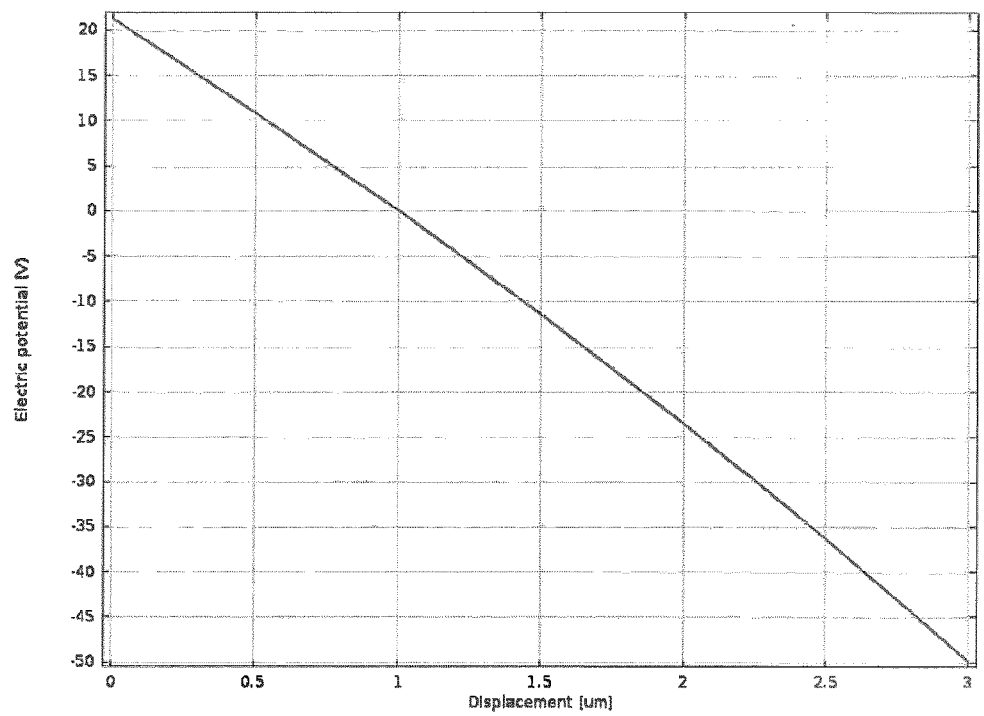
FIG. 19 provides a graph to show voltage drop across the active layer shown in FIG. 19 as a function of the width of the variable gap.

FIG. 19 illustrates potential drop across the "active" optically responsive layer due to changes in gap thickness. Voltage is positive in an un-actuated state and negative when the variable gap is narrowed. This is achieved by rearrangement of charge distribution within "virtual" ground planes. Virtual grounds can be achieved by making the ground plane significantly larger than the active color change device area. The embodiment affords an opportunity to enable repeated voltage switches and optical changes, if the device can be "reset" by resorting the size of the variable gap between the charged layers.

Figure 20:
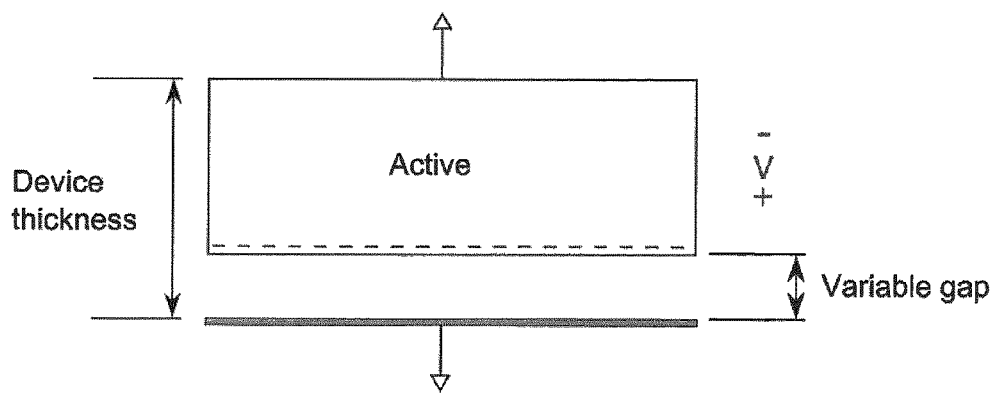
FIG. 20 schematically illustrates an exemplary device (in cross-section) that includes one charged layer and a ground plane electrode.

FIG. 20 schematically illustrates an alternative device arrangement comprising a single charged layer of electro-optical materials (labelled "active" layer) with a negative charge adjacent the variable gap. The electroptical materials provide an observable response with increased electrical field (e.g. liquid crystal, polymer dispersed liquid crystal, suspended particles). Compared to the device of FIG. 18 the second charged layer is replaced with a ground plane on the opposite side of the variable gap.

Figure 21:
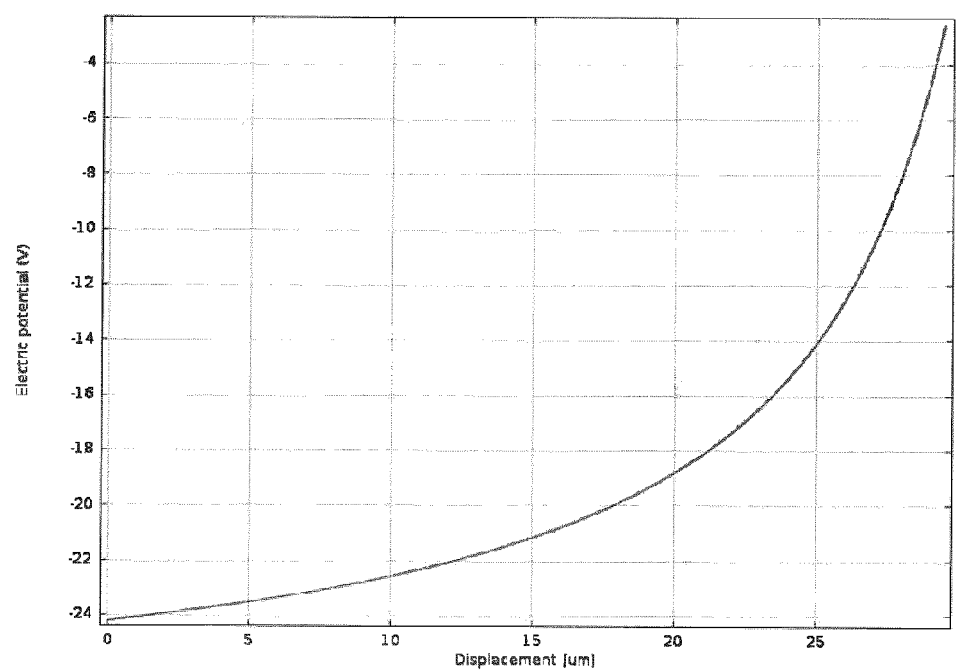
FIG. 21 provides a graph to show voltage drop across the active layer shown in FIG. 20 as a function of the width of the variable gap.

As illustrated by the graph in FIG. 21, the observed voltage drop across the active region can be controlled by adjusting the gap thickness. The voltage drop can be driven from large to small by reducing the gap, as seen in FIG. 21. Voltage is much larger in un-actuated state than when mechanical pressure is applied, which is achieved by forcing ~0 V on the "virtual ground plane". An effective virtual ground can be achieved by making the ground plane electrode significantly larger than the active color change device area. As with the device of FIG. 18, the device of FIG. 20 may be suitable for repeated switching between optical states by repeatedly reducing and increasing the size of the variable gap. For example, where mechanical pressure provides the external influence to change the optical appearance of the device, a deformable or squashable spacer layer between the "active" optically responsive layer and the ground plane electrode (i.e. in the variable gap) may provide the desired resilience for repeated cycles of observable optical changes.

Figure 22:
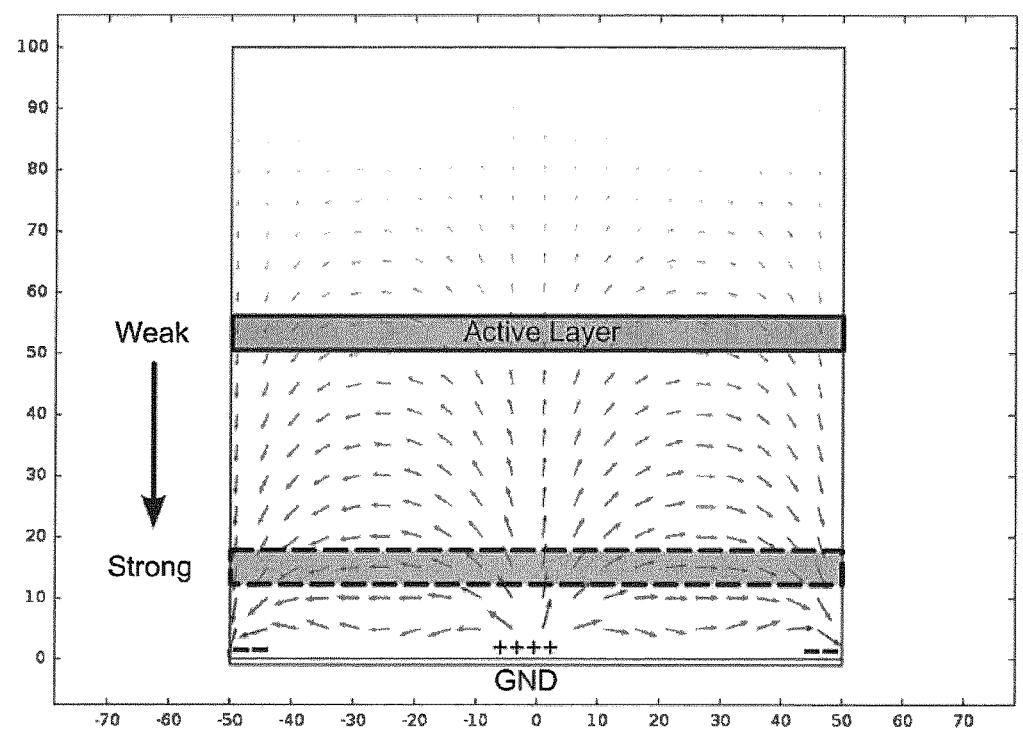
FIG. 22 schematically illustrates an electret structure using patterned positive and negative charge regions.
Figure 23:
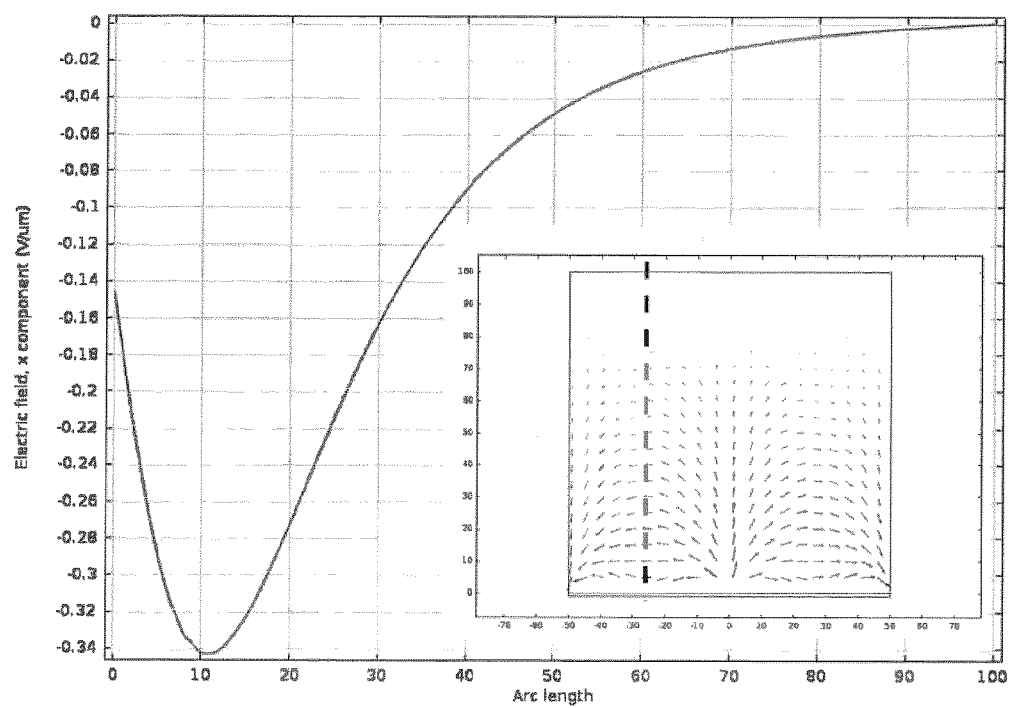
FIG. 23 provides a graph to illustrate lateral electrical field strength vs 'vertical' position within the device of FIG. 22.

FIG. 22 schematically illustrates another device that employs electrets/electrostatics, and employs and electret structure using patterned positive and negative charge regions. The electrical field vectors are illustrated with arrows in the surface plot shown. Moving the active layer vertically modulates the electric field impinging upon the layer as shown in FIG. 23. This embodiment is useful for materials/particles that rotate or migrate under an electric field (eg: polarizable particles, electrophoretic materials).

The graph in FIG. 23 thus illustrates lateral electric field strength vs vertical position within device. As one moves away from the patterned charges, the field strength decreases. Beyond a certain distance, the torque/charges associated with the electric field are smaller than the movement imparted by random motion and/or gravity. The direction of the field line and their value can be tuned by altering the pitch between charge regions or incorporation of ground planes.

This embodiment further illustrates that patterning of a control layer or (optically) responsive layer with different electric charges, magnetic charges, or materials with different plasmon resonances enables further content, characters, images and the like to be incorporated into the devices as herein disclosed, including both simple/increased transformations of images or moving images as the external influence is applied/increased or removed/decreased from the device.

Example 3—Comparison of Numeric Simulations for Electrets and Magnetic Dipoles

Figure 24:
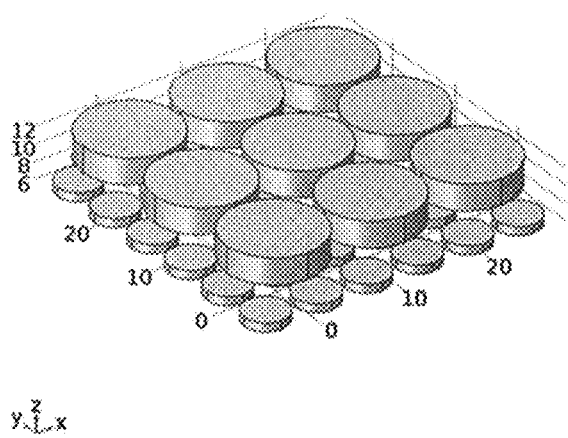
FIG. 24 illustrates schematically a simulation model to assess sufficient force can be generated to manipulate particles in accordance with select devices disclosed.
Figure 24:
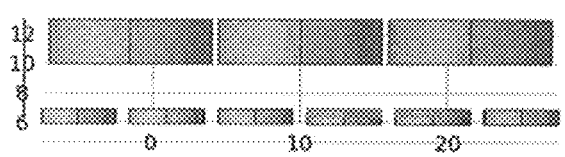

In each simulation, an array of charged or magnetized particles was spaced apart from an array of smaller platelets, as shown in FIG. 24. The force induced by the electric/magnetic field on these platelets was compared to gravitational forces. This was a check to ensure that sufficient force could be generated to manipulate the particles given the anticipated constraints on the strength of the electrets/magnets that could be realized. The structure was simulated for varying gap thickness to determine the point where gravitational effects overcome the electric/magnetic forces.

Figure 25:
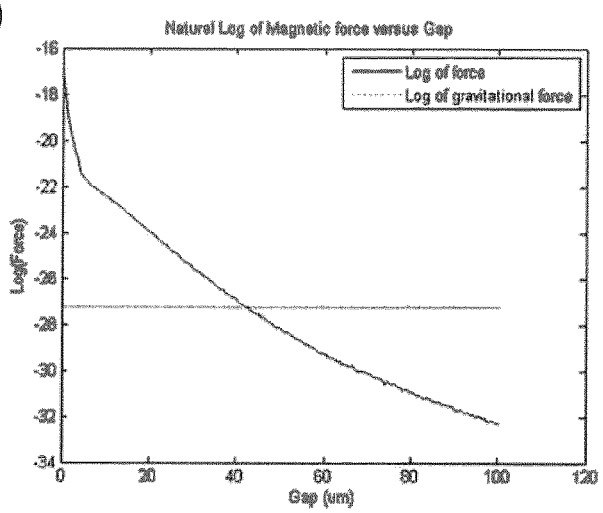
FIG. 25 compares simulation calculations for the model shown in FIG. 24 for a) a model that employs magnets, with b) a model that employs electrets.
Figure 25:
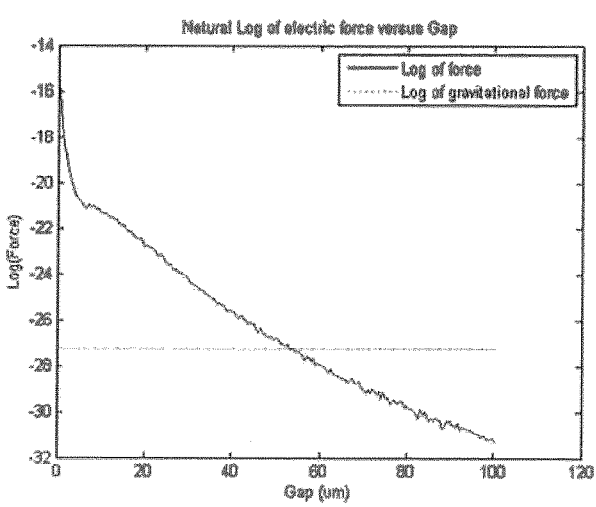

Corresponding results are shown in FIG. 25a for magnetic model results and FIG. 25b for electrets model results. For the magnetic model results (FIG. 25a) the descending curve illustrates the average force on four centre platelets, and the straight line graph indicates the force of gravity on a single platelet ($F_g$=1.5 pN). The forces are observed to 'cross' at around 42 µm separation distance. For the electret model results (FIG. 25b) the descending curve illustrated the average force on four centre platelets, and the straight line graph indicates the force of gravity on a single platelet ($F_g$=1.5 pN). The forces are observed to 'cross' at around 53 µm separation distance. The results thus illustrate the induced force relative to gravity as the gap thickness increased. These data demonstrate that there is sufficient force in this structure to influence an underlying "color change" particle, and illustrates the feasibility to generate movement of particles with a device comprising an assembly of magnets or electrets.

Whilst various embodiments of optically variable devices, items incorporating such devices, documents, as well as methods for their production and use, are described and illustrated herein, the scope of the appended claims is not limited to such embodiments, and the invention encompasses further embodiments readily obtainable in view the teachings presented herein.

REFERENCES (1) Nath, N.; Chilkoti, A. *Analytical Chemistry* 2002, 74, 504-509.
(2) Willets, K. A.; Van Duyne, R. P. *Annual Review of Physical Chemistry* 2007, 58, 267-297, PMID: 17067281.
(3) Jackson, J. B.; Halas, N. J. *Proceedings of the National Academy of Sciences* 2004, 101, 17930-17935.
(4) Tam, F.; Goodrich, G. P.; Johnson, B. R.; Halas, N. J. *Nano Letters* 2007, 7, 496-501.
(5) Kern, A. M.; Martin, O. J. F. *Phys. Rev. A* 2012, 85, 022501.
(6) Gandra, N. *J. Nanosci. Lett.* 2014, 4:23 2014,
(7) Cui, Y.; Zhou, J.; Tamma, V. A.; Park, W. *ACS Nano* 2012, 6, 2385-2393.
(8) Pryce, I. M.; Aydin, K.; Kelaita, Y. A.; Briggs, R. M.; Atwater, H. A. *Nano Letters* 2010, 10, 4222-4227.
(9) Sannomiya, T.; Hafner, C.; Vörös, J. *Opt. Lett.* 2009, 34, 2009-2011.
(10) Huang, F.; Baumberg, J. *J. Nano Letters* 2010, 10, 1787-1792.
(11) Han, X.; Liu, Y.; Yin, Y. *Nano Letters* 2014, 14, 2466-2470.
(12) Mock, J. J.; Hill, R. T.; Degiron, A.; Zauscher, S.; Chilkoti, A.; Smith, D. R. *Nano Letters* 2008, 8, 2245-2252.
(13) Moreau, A. *Nature* 2012, 492, 86-89.
(14) Johnson, B. R. *J. Opt. Soc. Am. A* 1992, 9, 1341-1351.
(15) Parsons, J.; Burrows, C.; Sambles, J.; Barnes, W. *Journal of Modern Optics* 2010, 57, 356-365.
(16) Bohren, C.; Huffman, D. *Absorption and Scattering of Light by Small Particles*; Wiley: New York, 1983.
(17) Mojarad, N. M.; Sandoghdar, V.; Agio, M. *J. Opt. Soc. Am. B* 2008, 25, 651-658.
(18) Mojarad, N. M.; Agio, M. *Opt. Express* 2009, 17, 117-122.
(19) Zhang, S.; Bao, K.; Halas, N. J.; Xu, H.; Nordlander, P. *Nano Letters* 2011, 11, 1657-1663.
(20) Gu, Y.; Qin, F.; Yang, J. K. W.; Yeo, S. P.; Qiu, C.-W. *Nanoscale* 2014, 6, 2106-2111.
(21) Encina, E. R.; Coronado, E. A. *The Journal of Physical Chemistry C* 2010, 114, 3918-3923.
(22) Ghosh, S. K.; Pal, T. *Chemical Reviews* 2007, 107, 4797-4862, PMID: 17999554.
(23) Johnson, P. B.; Christy, R. W. *Phys. Rev. B* 1972, 6, 4370-4379.
(24) Weimer, W. A.; Dyer, M. *J. Applied Physics Letters* 2001, 79, 3164-3166.
(25) Aslan, K.; Leonenko, Z.; Lakowicz, J.; Geddes, C. *Journal of Fluorescence* 2005, 15, 643-654.
(26) Santbergen, R.; Temple, T. L.; Liang, R.; Smets, A. H. M.; van Swaaij, R. A. C. M. M.; Zeman, M. *Journal of Optics* 2012, 14, 024010.
(27) Ocwieja, M.; Adamczyk, Z.; Morga, M.; Michna, A. *Journal of Colloid and Interface Science* 2011, 364, 39-48.
(28) Lu, G.; Li, H.; Zhang, H. *Chem. Commun.* 2011, 47, 8560-8562.

The invention claimed is:

1. An optically variable device, the device comprising:
a control element or layer comprising a material that is permanently or temporarily electrically charged or polarized such that an electric field emanates from the material;
one or more responsive optical element(s);
the control element or layer and the responsive optical element(s) moveable in the device relative to one another upon application of an external influence upon the device, to change the distance of separation of the control element or layer from the responsive optical element(s), and therefore to change the strength of the electric field impinging upon the responsive optical element(s) from the electrically charged or polarized material of the control element or layer;
the relative movement and/or the change of the strength of the electric field impinging upon the responsive optical element(s) causing a change of perceivable or detectable optical properties of the device,
wherein the control element or layer comprises an electrically insulating material that exhibits, or can be caused to adopt, a positive or negative electric charge or polarization sufficient to cause the electric field.

2. The optically variable device of claim 1, wherein the control element or layer comprises a piezoelectric material, wherein mechanical pressure or strain upon the piezoelectric material causes the material to generate the electric field.

3. The optically variable device of claim 1, wherein the control element or layer comprises at least one of a polymer, a plastic, a resin, silica, PTFE, or derivatives thereof.

4. The optically variable device of claim 1, wherein the responsive optical elements comprise electrically charged particles or particles with a permanent or induced dipole moment, the particles being suspended in a fluid and moveable by electrophoresis in the fluid in response to their exposure to an altered electric field caused by the external influence.

5. The optically variable device of claim 1, wherein the responsive optical element(s) comprise(s) electrochromic particles, polarizable electrostatic particles, polarized electrostatic particles, encapsulated particles, freely-rotatable particles or molecules, embedded liquid crystal microcapsules, or Janus particles that are responsive to the change of strength of the electric field impinging upon them.

6. The optically variable device of claim 1, wherein the responsive optical elements are caused to undergo at least partial rotation and/or translation when the device is exposed to the external influence.

7. The optically variable device of claim 1, wherein the responsive optical element(s) comprise a plurality of electrically charged particles or particles with a permanent or induced dipole moment, the particles encapsulated in a discrete layer from the control layer, the thickness of which is varied by the external influence, thereby to increase and/or decrease the distance of separation of the particles and the control element or layer.

8. The optically variable device of claim 1 wherein the device comprises an optically responsive layer comprising the responsive optical elements, and a spacer layer between and attached to the control layer and the optically responsive layer, the thickness of which is varied by a degree of the external influence.

9. The optically variable device of claim 1, wherein the optical properties of the device and/or any change of such properties, is macroscopic, microscopic, observable in visible light conditions or beyond visible light conditions.

10. The optically variable device of claim 1, wherein the responsive optical element(s), and/or the control layer, is/are present only upon discrete portions or areas of the device so that the device includes content detectable or visible in the presence and/or the absence of the external influence.

11. The optically variable device of claim 1 wherein the responsive optical element(s) form, or are present in, an optically responsive layer, and wherein the optically responsive layer and/or a spacer layer if present comprises a deformable material, changeable between a relaxed state, and a compressed state when the external stimulus in the form of increased mechanical pressure upon the device, resulting in a change in the distance of separation of the responsive optical element(s) and the control element or layer, and thus a change in the optical properties of the optically responsive layer.

12. The optically variable device of claim 11, wherein the optically responsive layer and/or the spacer layer if present comprises at least one adhesive material selected from the group consisting of acrylated urethanes, methacrylate esters, mercapto-esters and UV curable adhesives.

13. The optically variable device of claim 11, whereupon removal or reduction of mechanical pressure, the optically responsive layer and/or the deformable spacer layer if present of said device relaxes from said compressed state to said relaxed state.

14. The optically variable device of claim 11, wherein the deformable spacer layer has a non-uniform thickness when in said relaxed and/or said compressed state, such that different parts of the optically responsive layer exhibit different optical properties in the relaxed and/or compressed state according to their distances from the control layer, thereby to provide content to the device upon increased and/or decreased mechanical pressure upon the device.

15. The device of claim 1, wherein the external influence upon the responsive optical elements further causes a user-detectable tactile change in the device, when the device is exposed to said external influence.

16. A variable device that undergoes a user-detectable tactile change, the device comprising:

a control element or layer comprising a material that is permanently or temporarily electrically charged or polarized such that an electric field emanates from the material;

one or more responsive element(s);

the control element or layer and the responsive element(s) moveable in the device relative to one another upon application of an external influence upon the device, to change the distance of separation of the control element or layer from the responsive element(s), and therefore to change the strength of the electric field impinging upon the responsive element(s) from the electrically charged or polarized material of the control element or layer;

the relative movement and/or the change of the strength of the electric field impinging upon the responsive elements causing a change of perceivable or detectable physical properties of the device, wherein the control element or layer comprises an electrically insulating material that exhibits, or can be caused to adopt, a positive or negative electric charge or polarization sufficient to cause the electric field.

17. The variable device of claim 16, wherein the user-detectable change is a change in the thickness, texture, prominence, or appearance of the device.

18. A method of changing the appearance of an item or document comprising,
including the device according to claim 1 as a feature of the item or document.

19. An item or document comprising:
a core material; and
at least one device of claim 1 affixed to at least one side or surface of the document or item.

20. The item or document of claim 19, wherein the core material comprises at least one material selected from the group consisting of paper, polymer, plastic, and combinations or hybrids thereof.

21. The document of claim 19, further comprising a portion to be contacted with the optically variable device, thereby to cause a change in the optical properties of the device resulting from the contact by and/or pressure applied by the portion.

22. The document of claim 21, wherein the portion is pressed against the optically variable device, and the device comprises intaglio printing, thereby to provide a raised region as a pressure template to achieve the change in optical properties of the device.

23. The document of claim 22, wherein the portion to be pressed against the optically variable device comprises a transparent or translucent window in the document, such that any change in the visible appearance of the device can be observed through the window as the mechanical pressure is applied.

24. A method for checking whether a security document is a legitimate or counterfeit document, the security document comprising at least one device of claim 1 on at least one side thereof, the method comprising the steps of:
applying an external influence to at least one device; and
checking whether the external influence causes a perceivable or detectable change in the device, wherein an appropriate change is indicative that the security document is a legitimate document.

* * * * *